(12) United States Patent
Feng et al.

(10) Patent No.: US 10,405,303 B2
(45) Date of Patent: Sep. 3, 2019

(54) HARQ PROTOCOL

(71) Applicant: Sun Patent Trust, New York, NY (US)

(72) Inventors: Sujuan Feng, Frankfurt am Main (DE); Joachim Loehr, Wiesbaden (DE); Alexander Golitschek Edler von Elbwart, Darmstadt (DE); Christian Wengerter, Kleinheubach (DE)

(73) Assignee: Sun Patent Trust, New York, NY (US)

( * ) Notice: Subject to any disclaimer, the term of this patent is extended or adjusted under 35 U.S.C. 154(b) by 1 day.

(21) Appl. No.: 15/655,685

(22) Filed: Jul. 20, 2017

(65) Prior Publication Data

US 2017/0318578 A1    Nov. 2, 2017

Related U.S. Application Data

(63) Continuation of application No. 15/090,427, filed on Apr. 4, 2016, which is a continuation of application
(Continued)

(30) Foreign Application Priority Data

Oct. 2, 2009 (EP) ..................... 09172075

(51) Int. Cl.
H04W 72/04    (2009.01)
H04B 7/26    (2006.01)
(Continued)

(52) U.S. Cl.
CPC .... H04W 72/0413 (2013.01); H04B 7/15557 (2013.01); H04B 7/2606 (2013.01);
(Continued)

(58) Field of Classification Search
None
See application file for complete search history.

(56) References Cited

U.S. PATENT DOCUMENTS

2008/0025285 A1    1/2008    Kwon et al.
2008/0080424 A1    4/2008    Torsner et al.
(Continued)

FOREIGN PATENT DOCUMENTS

CN    101369878 A    2/2009
EP    1 389 847 A1    2/2004
(Continued)

OTHER PUBLICATIONS

3GPP TS 36.211 V8.3.0, "3rd Generation Partnership Project; Technical Specification Group Radio Access Network; Evolved Universal Terrestrial Radio Access (E-UTRA); Physical Channels and Modulation (Release 8)," May 2008, 77 pages.
(Continued)

*Primary Examiner* — Chi H Pham
*Assistant Examiner* — Raul Rivas
(74) *Attorney, Agent, or Firm* — Seed IP Law Group LLP

(57) ABSTRACT

The present invention relates to a method for configuring a retransmission protocol on the uplink between a network node and a relay node in a mobile communication system, the configuration being performed at a network node or at a relay node, and to the corresponding relay node apparatus and network node apparatus capable of configuring the retransmission protocol. In particular, the number of transmission processes is determined based on the position of time intervals available for the transmission and may be selected in order to control the round trip time of the retransmission protocol. Once the number of transmission processes has been configured, the transmission processes are mapped on the available time intervals in a predefined order and repetitively.

6 Claims, 18 Drawing Sheets

Related U.S. Application Data

No. 14/455,739, filed on Aug. 8, 2014, now Pat. No. 9,331,817, which is a continuation of application No. 13/498,551, filed as application No. PCT/EP2010/004795 on Aug. 4, 2010, now Pat. No. 8,837,440.

(51) Int. Cl.

| | | |
|---|---|---|
| *H04L 1/16* | (2006.01) | |
| *H04L 1/18* | (2006.01) | |
| *H04B 7/155* | (2006.01) | |
| *H04L 5/00* | (2006.01) | |
| *H04L 1/00* | (2006.01) | |
| *H04W 84/04* | (2009.01) | |

(52) U.S. Cl.
CPC .......... *H04L 1/1657* (2013.01); *H04L 1/1671* (2013.01); *H04L 1/1812* (2013.01); *H04L 1/1816* (2013.01); *H04L 1/1822* (2013.01); *H04L 1/1825* (2013.01); *H04L 1/1887* (2013.01); *H04L 1/1896* (2013.01); *H04L 5/0053* (2013.01); *H04W 72/0446* (2013.01); *H04B 7/15542* (2013.01); *H04L 1/1803* (2013.01); *H04L 2001/0097* (2013.01); *H04W 84/047* (2013.01)

(56) References Cited

U.S. PATENT DOCUMENTS

| | | |
|---|---|---|
| 2009/0103500 A1 | 4/2009 | Malkamaki et al. |
| 2009/0254790 A1 | 10/2009 | Pi et al. |
| 2009/0323564 A1 | 12/2009 | Chiu |
| 2010/0017671 A1 | 1/2010 | Cai et al. |
| 2010/0275086 A1 | 10/2010 | Bergquist et al. |
| 2010/0309892 A1 | 12/2010 | Torsner et al. |
| 2011/0007684 A1 | 1/2011 | Liu et al. |
| 2011/0182247 A1 | 7/2011 | Chun et al. |
| 2011/0194502 A1 | 8/2011 | Sung et al. |

FOREIGN PATENT DOCUMENTS

| | | |
|---|---|---|
| EP | 2 110 985 A2 | 10/2009 |
| WO | 2008/111795 A3 | 9/2008 |

OTHER PUBLICATIONS

3GPP TS 36.212 V8.3.0, "3rd Generation Partnership Project; Technical Specification Group Radio Access Network; Evolved Universal Terrestrial Radio Access (E-UTRA); Multiplexing and channel coding (Release 8)," May 2008, 48 pages.
3GPP TS 36.213 V8.8.0, "3rd Generation Partnership Project; Technical Specification Group Radio Access Network; Evolved Universal Terrestrial Radio Access (E-UTRA); Physical layer procedures (Release 8)," Sep. 2009, 77 pages.
Catt, "Considerations for TDD Relay Frame Structure," R1-091523, Agenda Item: 15.3, 3GPP TSG RAN WG1 meeting #56bis, Seoul, Korea, Mar. 23-27, 2009, 6 pages.
Communication pursuant to Article 94(3) EPC, dated Apr. 3, 2017, for corresponding EP Application No. 13 175 328.7-1874, 10 pages.
European Search Report, for corresponding European Application No. EP 09 17 2075, dated Apr. 1, 2010, 4 pages.
Ericsson, "On the number of hybrid ARQ processes in LTE," R1-073731, Agenda Item: 7.3, TSG-RAN WG1 #50, Athens, Aug. 20-24, 2007, 4 pages.
Ericsson, ST Ericsson, "Discussion of UL Un HARQ RTTs," R1-103515, Agenda Item: 6.6.1, 3GPP TSG-RAN WG1 #61bis, Dresden, Germany, Jun. 28-Jul. 2, 2010, 3 pages.
Erik Dahlman et al., "3G Evolution—HSPA and LTE for Mobile Broadband," 3G Evolution: HSPA and LTE for Mobile Broadband, Jan. 1, 2007, pp. 203-209; 309-312. (14 pages).
Fernando Andres Quiroga, "Master's Thesis—Link-to-System Interfaces for System Level Simulations Featuring Hybrid ARQ," Dec. 1, 2008, 85 pages.
Fernando Andres Quiroga, "Link-to-System Interfaces for System Level Simulations Featuring Hybrid ARQ," UPC, Dec. 1, 2008, 2 pages. (Abstract).
Huawei, "Un HARQ timing for Uplink FDD," R1-103456, Agenda Item 6.6.1, 3GPP TSG RAN WG1 Meeting #61bis, Dresden, Germany, Jun. 28-Jul. 2, 2010, 7 pages.
International Search Report, for corresponding International Application No. PCT/EP2010/004795, dated May 11, 2011, 10 pages.
IPWireless, "MAC stage 3 proposal for UL HARQ operation in TDD," R2-072527, 3GPP TSG RAN WG2 #58bis, Agenda Item: 5.2.1, Orlando, Florida, USA, Jun. 25-29, 2007, 6 pages.
LG Electronics, "Comparison of in-band relaying methods in FDD mode," R1-090664, Agenda Item: 12.5, 3GPP TSG RAN WG1 Meeting #56, Athens, Greece, Feb. 9-13, 2009, 7 pages.
LG Electronics Inc., "Backhaul subframe allocation considering HARQ operation," R1-093241, TSG-RAN WG1 Meeting #58, Agenda Item: 15.3, Shenzhen, China, Aug. 24-28, 2009, 3 pages.
MAC Rapporteurs (Ericsson, QUALCOMM Europe), "Summary of email discussion on MAC parameters," Tdoc R2-082520, 3GPP TSG-RAN WG2 #62, Agenda Item: 4.4.3, Kansas City, U.S.A., May 5-9, 2008, 13 pages.
Nokia Corporation, Nokia Siemens Networks, "HARQ in TDD (FS1)," R1-074345, 3GPP TSG RAN WG1 #50bis Meeting, Agenda Item: 6.3, Shanghai, China, Oct. 8-12, 2007, 6 pages.
Nokia, Nokia Siemens Networks, "UL HARQ Timing of TDD," R1-080957, 3GPP TSG RAN WG1 Meeting #52, Agenda Item: 6.3.6, Sorrento, Italy, Feb. 11-15, 2008, 3 pages.
Nokia, Nokia Siemens Networks, "HARQ Numbers of LTE TDD considering the proposal of special subframe," R1-080958, Agenda Item: 6.3.6, 3GPP TSG RAN WG1 #52 Meeting, Sorrento, Italy, Feb. 11-15, 2008, 4 pages.
Nokia, Nokia Siemens Networks, "UL HARQ Timing for TDD (Timing btw PUSCH and PHICH/Grant)," R1-081474, Agenda Item: 6.3.7, 3GPP TSG RAN WG1 Meeting #52bis, Shenzhen, China, Mar. 31-Apr. 4, 2008, 4 pages.
Office Action, for corresponding Chinese Application No. 201080054645.3, dated Aug. 29, 2014, 8 pages (with English Translation).
Panasonic, "UL/DL HARQ timing for backhaul," R1-104132, Agenda Item: 6.6.1, 3GPP TSG-RAN WG1 Meeting #61bis, Dresden, Germany, Jun. 28-Jul. 2, 2010, 7 pages.
Panasonic, "Comparison of UL/DL HARQ for backhaul," R1-104133, Agenda Item: 6.6.1, 3GPP TSG-RAN WG1 Meeting #61bis, Dresden, Germany, Jun. 28-Jul. 2, 2010, 7 pages.
Qualcomm Europe, "Preference for Relay Operation in LTE-A," R1-091049, Agenda Item: 12.5, 3GPP TSG-RAN WG1 #56, Athens, Greece, Feb. 9-13, 2009, 11 pages.
Quiroga, Fernando Andres, "Link-to-System Interfaces for System Level Simulations Featuring Hybrid ARQ," Master's Thesis, Technische Universitat Munchen Lehrstuhl fur Kommunikationsnetze, Nov. 11, 2008, 5 pages.
Research in Motion UK Limited, "Relay Link HARQ Operation," R1-093293, Agenda Item: 15.3, 3GPP TSG RAN WG1 Meeting #58, Shenzhen, China, Aug. 24-28, 2009, 8 pages.
Wikipedia, "Round-trip delay time," retrieved Apr. 19, 2011, from http://en.wikipedia.org/w/index.php?title=Round-trip-delay_time&p . . . , 2 pages.

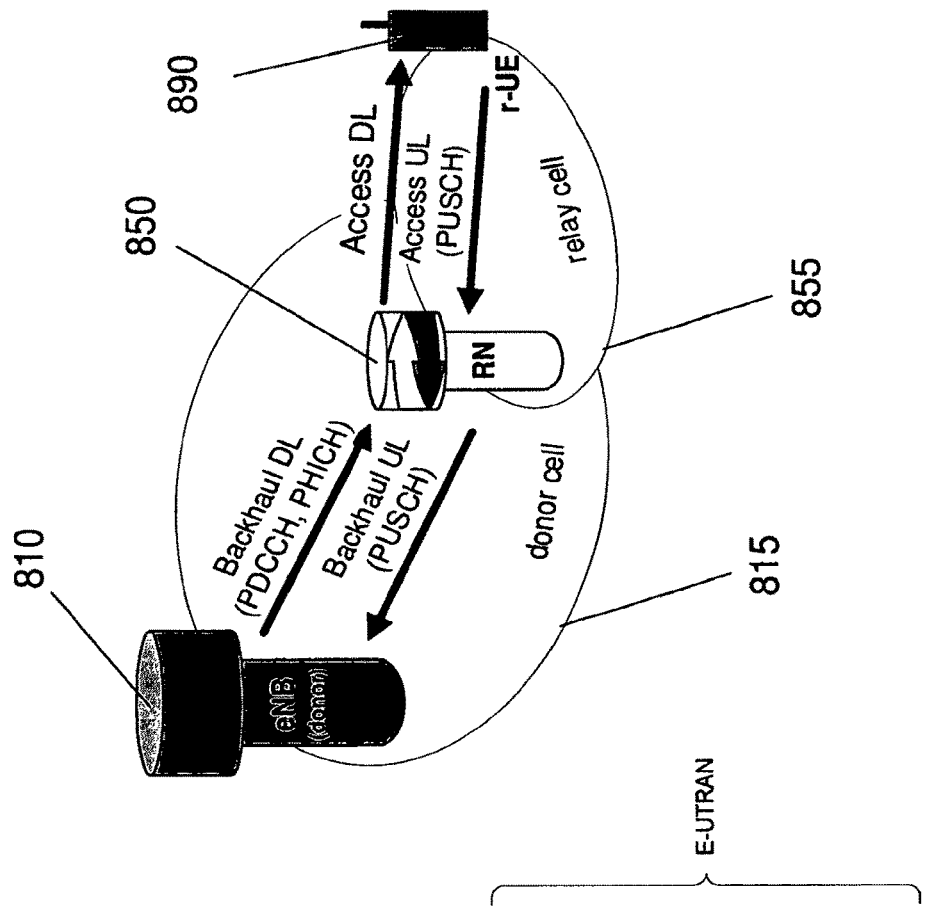
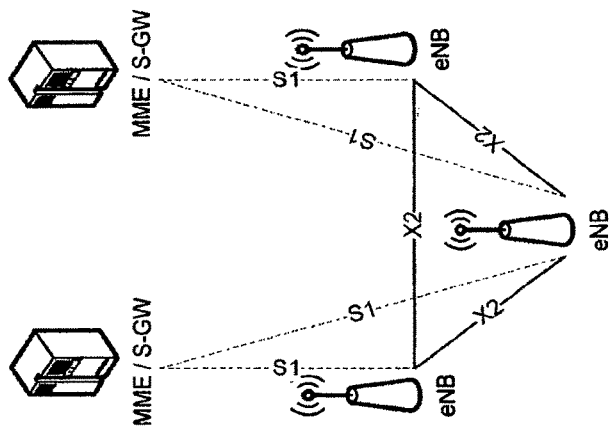

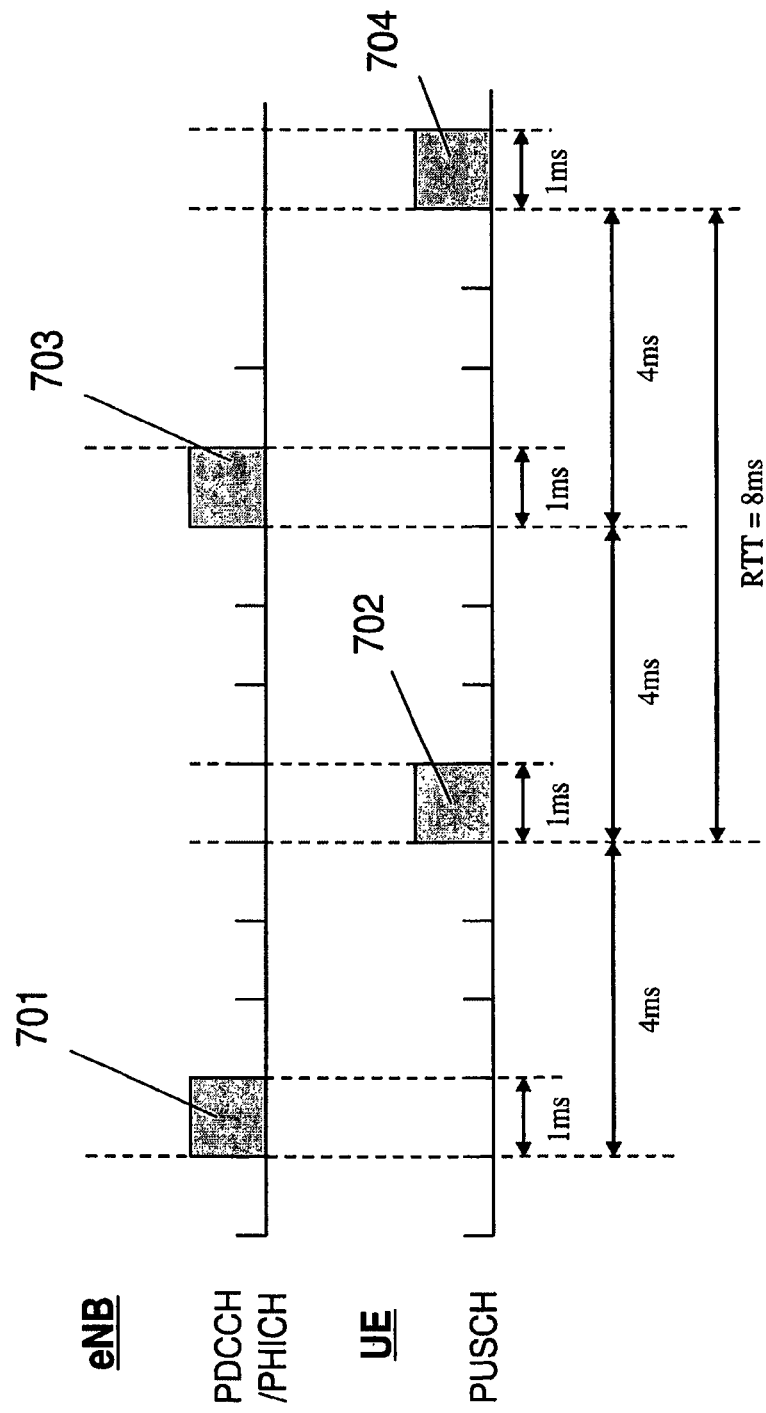

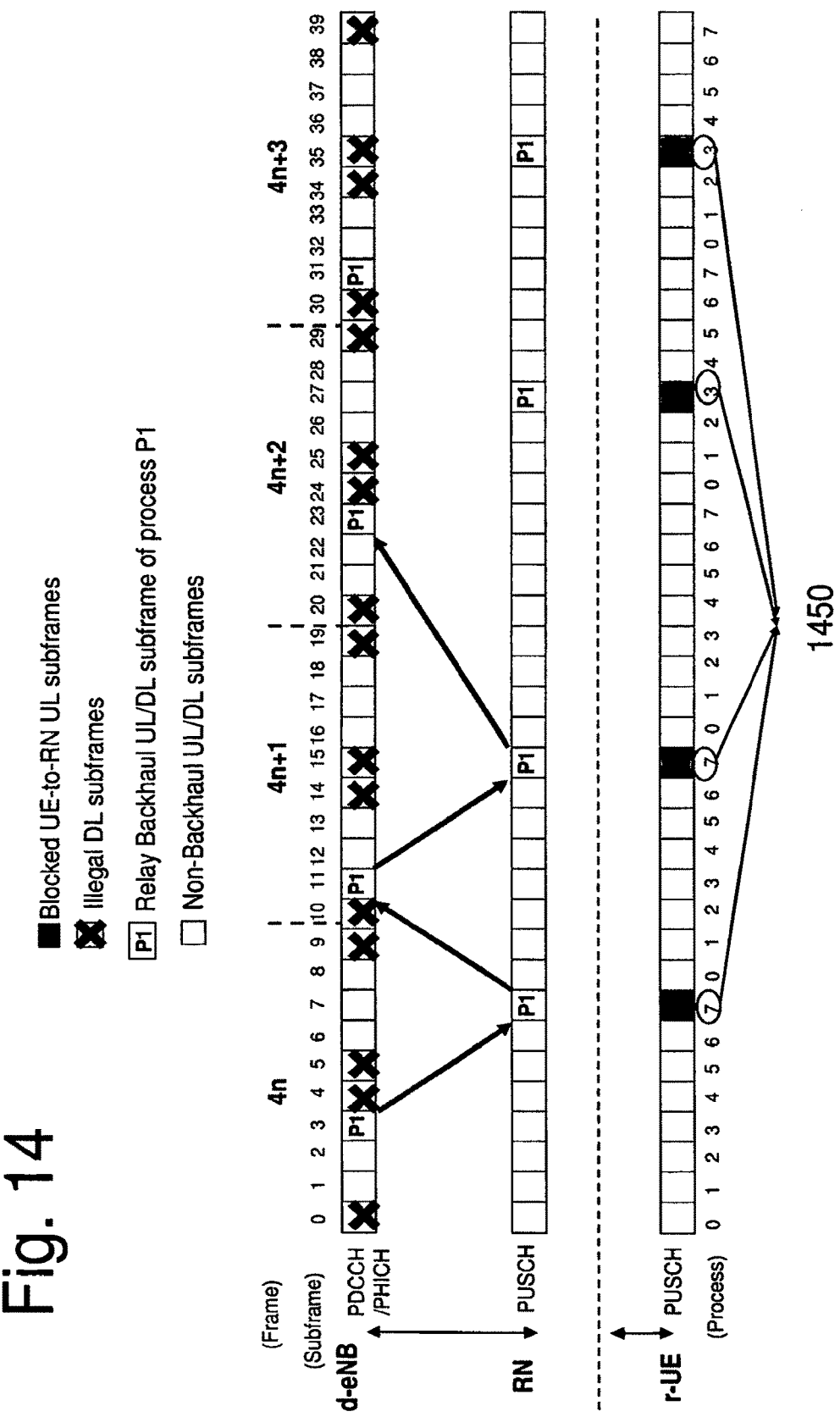

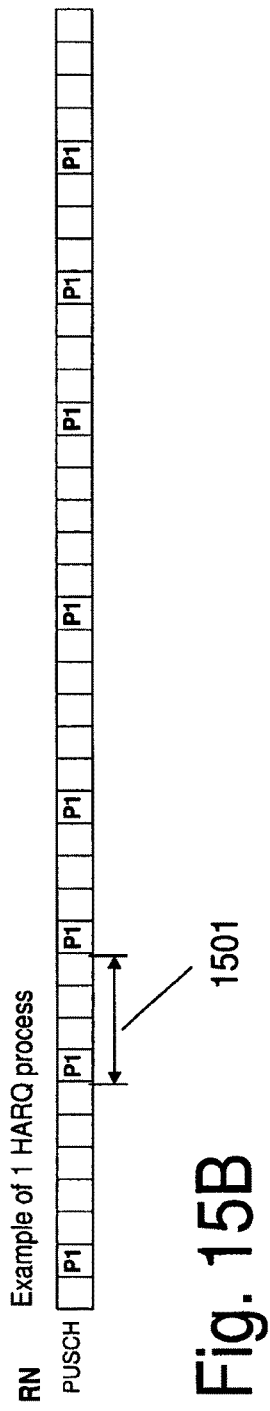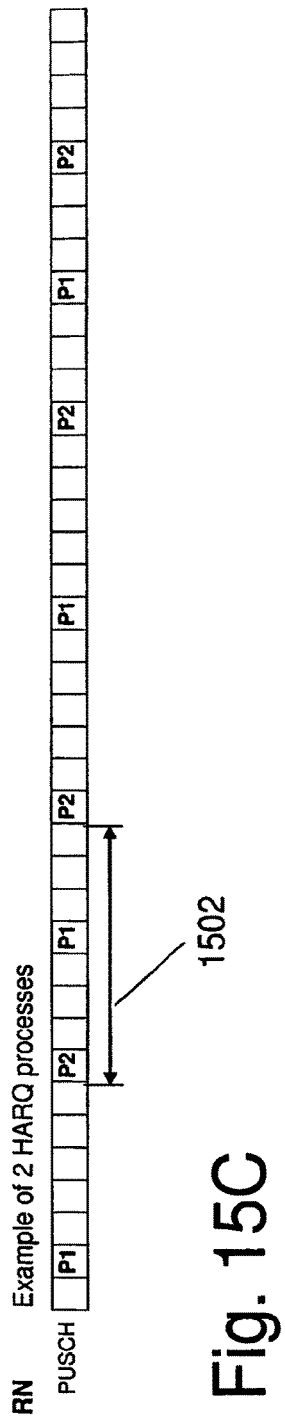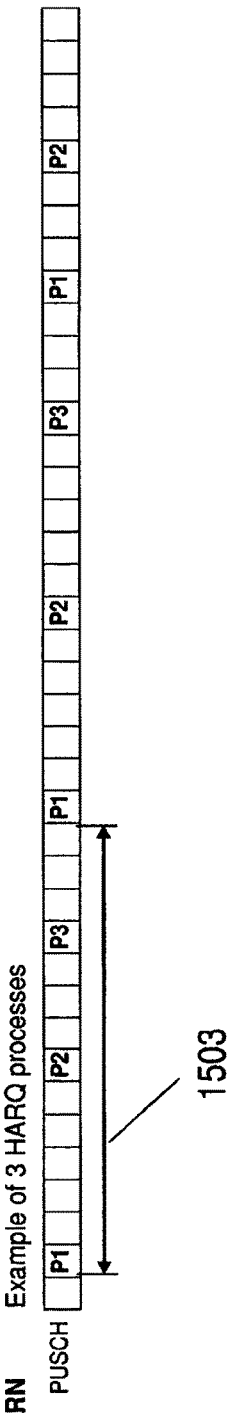

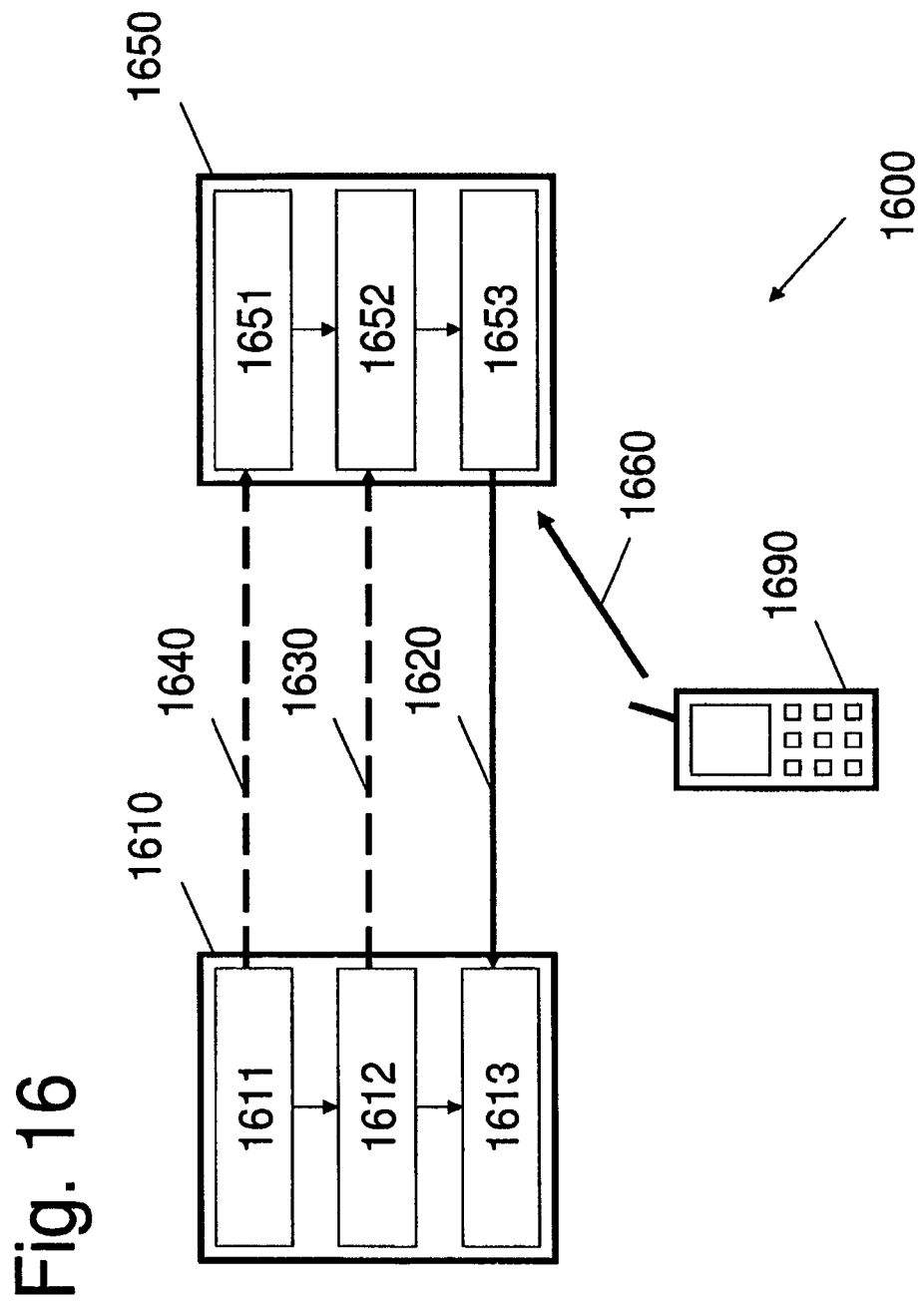

HARQ PROTOCOL

The present invention relates to a retransmission protocol for a mobile communication system.

BACKGROUND OF THE INVENTION

Third-Generation (3G) mobile systems, such as for instance Universal Mobile Telecommunications System (UMTS) standardized within the Third-Generation Partnership Project (3GPP), have been based on Wideband Code Division Multiple Access (WCDMA) radio access technology. Today, the 3G systems are being deployed on a broad scale all around the world. After enhancing this technology by introducing High-Speed Downlink Packet Access (HSDPA) and an enhanced uplink, the next major step in evolution of the UMTS standard has brought a combination of Orthogonal Frequency Division Multiplexing (OFDM) for the downlink and Single Carrier Frequency Division Multiplexing Access (SC-FDMA) for the uplink. This system has been named Long-Term Evolution (LTE) since it has been intended to cope with future technology evolutions.

The target of LTE is to achieve significantly higher data rates compared to HSDPA and HSUPA, to improve the coverage for the high data rates, to significantly reduce latency in the user plane in order to improve the performance of higher layer protocols (for example, TCP), as well as to reduce delay associated with control plane procedures such as, for instance, session setup. Focus has been given to the convergence towards use of Internet Protocol (IP) as a basis for all future services, and, consequently, on the enhancements to the packet-switched (PS) domain. LTE's radio access shall be extremely flexible, using a number of defined channel bandwidths between 1.25 and 20 MHz (contrasted with original UMTS fixed 5 MHz channels).

A radio access network is responsible for handling all radio-access related functionality including scheduling of radio channel resources. The core network may be responsible for routing calls and data connections to external networks. In general, today's mobile communication systems (for instance GSM, UMTS, cdma200, IS-95, and their evolved versions) use time and/or frequency and/or codes and/or antenna radiation pattern to define physical resources. These resources can be allocated for a transmission for either a single user or divided to a plurality of users. For instance, the transmission time can be subdivided into time periods usually called time slots then may be assigned to different users or for a transmission of data of a single user. The frequency band of such a mobile systems may be subdivided into multiple subbands. The data may be spread using a (quasi) orthogonal spreading code, wherein different data spread by different codes may be transmitted using, for instance, the same frequency and/or time. Another possibility is to use different radiation patterns of the transmitting antenna in order to form beams for transmission of different data on the same frequency, at the same time and/or using the same code.

FIG. 1 schematically illustrates LTE architecture. The LTE network is a two-node architecture consisting of access gateways (aGW) 110 and enhanced network nodes, so-called eNode Bs (eNB) 121, 122 and 123. The access gateways handle core network functions, i.e. routing calls and data connections to external networks, and also implement radio access network functions. Thus, the access gateway may be considered as combining the functions performed by Gateway GPRS Support Node (GGSN) and Serving GPRS Support Node (SGSN) in today's 3G networks and radio access network functions, such as for example header compression, ciphering/integrity protection. The eNodeBs handle functions such as for example Radio Resource Control (RRC), segmentation/concatenation, scheduling and allocation of resources, multiplexing and physical layer functions. The air (radio) interface is thus an interface between a User Equipment (UE) and an eNodeB. Here, the user equipment may be, for instance, a mobile terminal 132, a PDA 131, a portable PC, a PC, or any other apparatus with receiver/transmitter conform to the LTE standard.

Multi carrier transmission introduced on the enhanced UMTS terrestrial radio access network (E-UTRAN) air interface increases the overall transmission bandwidth, without suffering from increased signal corruption due to radio-channel frequency selectivity. The proposed E-UTRAN system uses OFDM for the downlink and SC-FDMA for the uplink and employs MIMO with up to four antennas per station. Instead of transmitting a single wideband signal such as in earlier UMTS releases, multiple narrow-band signals referred to as "subcarriers" are frequency multiplexed and jointly transmitted over the radio link. This enables E-UTRA to be much more flexible and efficient with respect to spectrum utilization.

FIG. 2 illustrates an example of E-UTRAN architecture. The eNBs communicate with the Mobility Management Entity (MME) and/or serving gateway (S-GW) via an interface S1. Furthermore, eNBs communicate with each other over an interface X2.

In order to suit as many frequency band allocation arrangements as possible, LTE standard supports two different radio frame structures, which are applicable to Frequency Division Duplex (FDD) and Time Division Duplex (TDD) modes of the standard. LTE can co-exist with earlier 3GPP radio technologies, even in adjacent channels, and calls can be handed over to and from all 3GPP's previous radio access technologies.

The general baseband signal processing in LTE downlink is shown in FIG. 3 (cf. 3GPP TS 36.212 "Multiplexing and Channel Coding", Release 8, v. 8.3.0, May 2008, available at http://www.3gpp.org and incorporated herein by reference). First, information bits, which contain the user data or the control data, are block-wise encoded (channel coding by a forward error correction such as turbo coding) resulting in codewords. The blocks of encoded bits (codewords) are then scrambled 310. By applying different scrambling sequences for neighboring cells in downlink, the interfering signals are randomized, ensuring full utilization of the processing gain provided by the channel code. The blocks of scrambled bits (codewords), which form symbols of predefined number of bits depending on the modulation scheme employed, are transformed 320 to blocks of complex modulation symbols using the data modulator. The set of modulation schemes supported by LTE downlink (DL) includes QPSK, 16-QAM and 64-QAM corresponding to two, four or six bits per modulation symbol.

Layer mapping 330 and precoding 340 are related to Multiple-Input/Multiple-Output (MIMO) applications supporting more receiving and/or transmitting antennas. The complex-valued modulation symbols for each of the codewords to be transmitted are mapped onto one or several layers. LTE supports up to four transmitting antennas. The antenna mapping can be configured in different ways to provide multi antenna schemes including transmit diversity, beam forming, and spatial multiplexing. The set of resulting symbols to be transmitted on each antenna is further mapped 350 on the resources of the radio channel, i.e., into the set of resource blocks assigned for particular UE by a scheduler for transmission. The selection of the set of resource blocks by the scheduler depends on the channel quality indicator (CQI)—feedback information signalized in the uplink by the UE and reflecting the measured channel quality in the downlink. After mapping of symbols into the set of physical resource blocks, an OFDM signal is generated 360 and transmitted from the antenna ports. The generation of OFDM signal is performed using inverse discrete Fourier transformation (fast Fourier transformation FFT).

The LTE uplink transmission scheme for both FDD and TDD mode is based on SC-FDMA (Single Carrier Frequency Division Multiple Access) with cyclic prefix. A DFT-spread-OFDM method is used to generate an SC-FDMA signal for E-UTRAN, DFT standing for Discrete Fourier Transformation. For DFT-spread-OFDM, a DFT of size M is first applied to a block of M modulation symbols. The E-UTRAN uplink supports, similarly to the downlink QPSK, 16-QAM and 64-QAM modulation schemes. The DFT transforms the modulation symbols into the frequency domain and the result is mapped onto consecutive subcarriers. Subsequently, an inverse FFT is performed is performed as in OFDM downlink, followed by addition of the cyclic prefix. Thus, the main difference between SC-FDMA and OFDMA signal generation is the DFT processing. In an SC-FDMA signal, each subcarrier contains information of all transmitted modulation symbols, since the input data stream has been spread by the DFT transform over the available subcarriers. In OFDMA signal, each subcarrier only carries information related to specific modulation symbols. The uplink (UL) will support BPSK, QPSK, 8PSK and 16QAM.

FIG. 4 illustrates the time domain structure for LTE transmission applicable to FDD mode. The radio frame 430 has a length of $T_{frame}=10$ ms, corresponding to the length of a radio frame in previous UMTS releases. Each radio frame further consists of ten equally sized subframes 420 of the equal length $T_{subframe}=1$ ms. Each subframe 420 further consists of two equally sized time slots (TS) 410 of length $T_{slot}=0.5$ ms. Up to two codewords can be transmitted in one subframe.

FIG. 5 illustrates the time domain structure for LTE transmission applicable to TDD mode. Each radio frame 530 of length $T_{frame}=10$ ms consists of two half-frames 540 of length 5 ms each. Each half-frame 540 consists of five subframes 520 with length $T_{subframe}=1$ ms and each subframe 520 further consists of two equally sized time slots 510 of length $T_{slot}=0.5$ ms.

Three special fields called DwPTS 550, GP 560, and UpPTS 570 are included in each half-frame 540 in subframe number SF1 and SF6, respectively (assuming numbering of ten subframes within a radio frame from SF0 to SF9). Subframes SF0 and SF5 and special field DwPTS 350 are always reserved for downlink transmission.

The physical resources for the OFDM (DL) and SC-FDMA (UL) transmission are often illustrated in a time-frequency grid wherein each column corresponds to one OFDM or SC-FDMA symbol and each row corresponds to one OFDM or SC-FDMA subcarrier, the numbering of columns thus specifying the position of resources within the time domain, and the numbering of the rows specifying the position of resources within the frequency domain.

The time-frequency grid of $N_{RB}^{UL}N_{sc}^{RB}$ subcarriers and $N_{symb}^{UL}$ SC-FDMA symbols for a time slot TS0 610 in uplink is illustrated in FIG. 6. The quantity $N_{RB}^{UL}$ depends on the uplink transmission bandwidth configured in the cell. The number $N_{symb}^{UL}$ of SC-FDMA symbols in a time slot depends on the cyclic prefix length configured by higher layers. A smallest time-frequency resource corresponding to a single subcarrier of an SC-FDMA symbol is referred to as a resource element 620. A resource element 620 is uniquely defined by the index pair (k,l) in a time slot where $k=0, \ldots, N_{RB}^{UL}N_{sc}^{RB}-1$ and $l=0, \ldots, N_{symb}^{UL}-1$ are the indices in the frequency and time domain, respectively. The uplink subcarriers are further grouped into resource blocks (RB) 630. A physical resource block is defined as $N_{symb}^{UL}$ consecutive SC-FDMA symbols in the time domain and $N_{sc}^{RB}$ consecutive subcarriers in the frequency domain. Each resource block 630 consists of twelve consecutive subcarriers and span over the 0.5 ms slot 610 with the specified number of SC-FDMA symbols.

In 3GPP LTE, the following downlink physical channels are defined (3GPP TS 36.211 "Physical Channels and Modulations", Release 8, v. 8.3.0, May 2008, available at http://www.3gpp.org):

Physical Downlink Shared Channel (PDSCH)
Physical Downlink Control Channel (PDCCH)
Physical Broadcast Channel (PBCH)
Physical Multicast Channel (PMCH)
Physical Control Format Indicator Channel (PCFICH)
Physical HARQ Indicator Channel (PHICH)

In addition, the following uplink channels are defined:
Physical Uplink Shared Channel (PUSCH)
Physical Uplink Control Channel (PUCCH)
Physical Random Access Channel (PRACH).

The PDSCH and the PUSCH are utilized for data and multimedia transport in downlink (DL) and uplink (UL), respectively, and hence designed for high data rates. The PDSCH is designed for the downlink transport, i.e. from eNode B to at least one UE. In general, this physical channel is separated into discrete physical resource blocks and may be shared by a plurality of UEs. The scheduler in eNodeB is responsible for allocation of the corresponding resources, the allocation information is signalized. The PDCCH conveys the UE specific and common control information for downlink and the PUCCH conveys the UE specific control information for uplink transmission.

Downlink control signaling is carried by the following three physical channels:

Physical Control Format Indicator Channel (PCFICH) utilized to indicate the number of OFDM symbols used for control channels in a subframe, Physical Hybrid Automatic Repeat Request Indicator Channel (PHICH) utilized to carry downlink acknowledgements (positive: ACK, negative: NAK) associated with uplink data transmission, and Physical Downlink Control Channel (PDCCH) which carries downlink scheduling assignments and uplink scheduling grants.

In LTE, the PDCCH is mapped to the first n OFDM symbols of a subframe, wherein n is more than or equal to 1 and is less than or equal to three. Transmitting PDCCH in the beginning of the subframe has the advantage of early decoding of the corresponding L1/L2 control information included therein.

Hybrid ARQ is a combination of Forward Error Correction (FEC) and the retransmission mechanism Automatic Repeat reQuest (ARQ). If a FEC encoded packet is transmitted and the receiver fails to decode the packet correctly, the receiver requests a retransmission of the packet. Errors are usually checked by a CRC (Cyclic Redundancy Check) or by parity check code. Generally, the transmission of additional information is called "retransmission (of a data packet)", although this retransmission does not necessarily mean a transmission of the same encoded information, but could also mean the transmission of any information belonging to the packet (e.g. additional redundancy information).

In LTE there are two levels of re-transmissions for providing reliability, namely, HARQ at the MAC (Medium Access Control) layer and outer ARQ at the RLC (Radio Link Control) layer. The outer ARQ is required to handle residual errors that are not corrected by HARQ that is kept simple by the use of a single bit error-feedback mechanism, i.e. ACK/NACK.

On MAC, LTE employs a hybrid automatic repeat request (HARQ) as a retransmission protocol. The HARQ in LTE is an N-process Stop-And-Wait method HARQ with asynchronous re-transmissions in the downlink and synchronous re-transmissions in the uplink. Synchronous HARQ means that the re-transmissions of HARQ blocks occur at predefined periodic intervals. Hence, no explicit signaling is required to indicate to the receiver the retransmission schedule. Asynchronous HARQ offers the flexibility of scheduling re-transmissions based on air interface conditions. In this case an identification of the HARQ process needs to be signaled in order to enable a correct combing and protocol operation. HARQ operation with eight processes is decided for LTE.

In uplink HARQ protocol operation there are two different options on how to schedule a retransmission. Retransmissions in a synchronous non-adaptive retransmission scheme are either scheduled by a NAK. Retransmissions in a synchronous adaptive retransmissions mechanism are explicitly scheduled on PDCCH.

In case of a synchronous non-adaptive retransmission the retransmission will use the same parameters as the previous uplink transmission, i.e. the retransmission will be signaled on the same physical channel resources respectively uses the same modulation scheme. Since synchronous adaptive retransmission is explicitly scheduled via PDCCH, the eNB has the possibility to change certain parameters for the retransmission. A retransmission could be for example scheduled on a different frequency resource in order to avoid fragmentation in the uplink, or the eNB could change the modulation scheme or alternatively indicate to the UE what redundancy version to use for the retransmission. It should be noted that the HARQ feedback including a positive or a negative acknowledgement (ACK/NAK) and PDCCH signaling occurs at the same timing. Therefore the UE only needs to check once whether a synchronous non-adaptive retransmission is triggered, whether only a NAK is received, or whether eNB requests a synchronous adaptive retransmission, i.e. a PDCCH is signaled in addition to the HARQ feedback on PHICH. The maximum number of retransmissions is configured per UE rather than per radio bearer.

The time schedule of the uplink HARQ protocol in LTE is illustrated in FIG. 7. The eNB transmits to the UE a first grant 701 on PDCCH. In response to the first grant 701, the UE transmits first data 702 to the eNB on PUSH. The timing between PDCCH uplink grant and PUSCH transmission is fixed to 4 ms. After receiving the first transmission 702, from the UE, the eNB transmits a second grant or feedback information (ACK/NAK) 703. The timing between the PUSCH transmission and the corresponding PHICH carrying the feedback information is fixed to 4 ms. Consequently, the Round Trip Time (RTT) indicating the next chance of transmission in LTE Release 8 uplink HARQ protocol is 8 ms. After these 8 ms, the UE may transmit a second data 704.

Measurement gaps for performing measurements at the UE are of higher priority than HARQ retransmissions. Whenever an HARQ retransmission collides with a measurement gap, the HARQ retransmission does not take place.

A key new feature of LTE is the possibility to transmit multicast or broadcast data from multiple cells over a synchronized single frequency network. This feature is called Multimedia Broadcast Single Frequency Network (MBSFN) operation. In MBSFN operation, UE receives and combines synchronized signals from multiple cells. In order to enable MBSFN reception, a UE needs to perform a separate channel estimation based on MBSFN Reference Signal (MBSFN RS). In order to avoid mixing MBSFN RS and normal reference signals in the same subframe, certain subframes known as MBSFN subframe, are reserved for MBSFN transmission. In an MBSFN subframe, up to two of the first OFDM symbols are reserved for a non-MBSFN transmission and the remaining OFDM symbols are used for MBSFN transmission. In the first up to two OFDM symbols, signaling data is carried such as PDCCH for transmitting uplink grants and PHICH for transmitting ACK/NAK feedback. The cell specific reference signal is the same as for non-MBSFN subframes.

The pattern of subframes reserved for MBSFN transmission in a cell is broadcasted in the System Information of the cell. Subframes with numbers 0, 4, 5 and 9 cannot be configured as MBSFN subframes. MBSFN subframe configuration supports both 10 ms and 40 ms periodicity. In order to support the backward compatibility, the UEs, which are not capable of receiving MBSFN, shall decode the first up to two OFDM symbols and ignore the remaining OFDM symbols in the subframe.

The International Telecommunication Union (ITU) has coined the term International mobile Communication (IMT) Advanced to identify mobile systems whose capabilities go beyond those of IMT-2000. In order to meet this new challenge, 3GPPs organizational partners have agreed to widen the scope of 3GPP study and work to include systems beyond 3G. Further advances for E-UTRA (LTE-Advanced) should be studied in accordance with the 3GPP operator requirements for the evolution of E-UTRA and with the need to meet/exceed the IMT-Advanced capabilities. The Advanced E-UTRA is expected to provide substantially higher performance compared to the expected IMT-Advanced requirements in ITU Radio.

In order to increase the overall coverage and the coverage for services with high data rates, to improve group mobility, enable temporary network deployment and increase the sell-edge throughput, relaying is studied for LTE-Advanced. In particular, a relay node is wirelessly connected to the radio-access network via a so-called donor cell. Depending on the relaying strategy, the relay node may be a part of the donor cell or may control its own cells. When the relay node (RN) is part of a donor cell, the relay node does not have its own cell identity but may still have a relay ID. At least part of the radio resource management (RRM) is controlled by the eNB to which the donor cell belongs, while parts of the RRM may be located in the relay. In this case, a relay should preferably support also Rel-8 LTE UEs. Smart repeaters, decode-and-forward relays and different types of Layer 2 relays are examples of this type of relaying.

If the relay node is in control of cells of its own, the relay node controls one or several cells and a unique physical-layer cell identity is provided in each of the cells controlled by the relay node. The same RRM mechanisms are available and from a UE perspective there is no difference in accessing cells controlled by a relay and cells controlled by a "normal"

eNodeB. The cells controlled by the relay should support also Rel-8 LTE UEs. Self-backhauling (Layer 3 relay) uses this type of relaying.

The connection of the relay to the network may be an inband connection, in which the network-to-relay link shares the same band with direct network-to-UE links within the donor cell. Release 8 UEs should be able to connect to the donor cell in this case. Alternatively, the connection may be an outband connection, in which the network-to-relay link does not operate in the same band as direct network-to-UE links within the donor cell.

With respect to the knowledge in the UE, relays can be classified into transparent, in which case the UE is not aware of whether or not it communicates with the network via the relay, and non-transparent, in which case the UE is aware of whether or not it is communicating with the network via the relay.

At least so-called "Type 1" relay nodes are part of LTE-Advanced. A "type 1" relay node is a relay node characterized by the following features:

It controls cells, each of which appears to a UE as a separate cell distinct from the donor cell.

The cells shall have its own physical cell ID (defined in LTE Rel-8) and the relay node shall transmit its own synchronization channels, reference symbols, etc.

In the context of a single-cell operation, the UE shall receive scheduling information and HARQ feedback directly from the relay node and send its control channels (SR/CQI/ACK) to the relay node.

The relay node shall appear as a Rel-8 eNB to Rel-8 UEs, in order to provide backward compatibility.

In order to allow for further performance enhancement, a type-1 relay node shall appear differently from the Rel-8 eNB to the LTE-Advanced UEs.

The LTE-A network structure of an E-UTRAN with a donor eNB 810 in a donor cell 815 and a relay node 850 providing a relay cell 855 to a UE 890 is shown in FIG. 8. The link between the donor eNB (d-eNB) 810 and the relay node 850 is named as relay backhaul link. The link between the relay node 850 and the UEs (r-UEs) 890 attached to the relay node is called relay access link.

If the link between the d-eNB 810 and the relay node 850 operates on the same frequency spectrum as the link between the relay node 850 and the UE 980, simultaneous transmissions on the same frequency resource between the d-eNB 810 and the relay node 850, and between the relay node 850 and the UE 890, may not be feasible since the relay node transmitter could cause interference to its own receiver unless sufficient isolation of the outgoing and incoming signals is provided. Therefore, when the relay node 850 transmits to the donor d-eNB 810, it cannot receive from the UEs 890 attached to the relay node. Similarly, when the relay node 850 receives from the donor eNB 810, it cannot transmit to the UEs 890 attached to the relay node.

Consequently, there is a subframe partitioning between the relay backhaul link (link between the d-eNB and the relay node) and relay access link (link between the relay node and a UE). It has been currently agreed that relay backhaul downlink subframes, during which a downlink backhaul transmission (d-eNB to relay node) may occur, are semi-statically assigned, for instance, configured by radio resource protocol (by d-eNB). Furthermore, relay backhaul uplink subframes, during which an uplink backhaul transmission may occur (relay node to d-eNB), are semi-statically assigned or implicitly derived by HARQ timing from the relay backhaul downlink subframes.

In the relay backhaul downlink subframes, the relay node 850 will transmit to the d-eNB 810. Thus, the r-UEs 890 are not supposed to expect any transmission from the relay node 850. In order to support backward compatibility for r-UEs 890, the relay node 850 configures backhaul downlink subframes as MBSFN subframes in the relay node 850.

FIG. 9 illustrates the structure of such a relay backhaul downlink transmission. As shown in FIG. 3, each relay backhaul downlink subframe consists of two parts, control symbols 911 and data symbols 915. In the first up to two OFDM symbols, the relay node transmits to the r-UEs control symbols as in case of a normal MBSFN subframe. In the remaining part of the subframe, the relay node may receive data 931 from the d-eNB. Thus, there cannot be any transmission from the relay node to the r-UE in the same subframe 922. The r-UE receives the first up to two OFDM control symbols and ignores the rest part 932 of the subframe 922 marked as an MBSFN subframe. Non-MBSFN subframes 921 are transmitted from the relay node to the r-UE and the control symbols as well as the data symbols 941 are processed by the r-UE.

An MBSFN subframe can be configured for every 10 ms or every 40 ms, thus, the relay backhaul downlink subframes also support both 10 ms and 40 ms configuration. Similarly to the MBSFN subframe configuration, the relay backhaul downlink subframes cannot be configured at subframes with numbers 0, 4, 5 and 9. Those subframes that are not allowed to be configured as backhaul downlink subframes are called "illegal DL subframes" throughout this document.

FIG. 10 shows applying of the LTE release 8 uplink HARQ protocol on the relay backhaul link. If LTE Release 8 uplink HARQ protocol (cf. FIG. 7) is reused on the relay uplink backhaul link 1001 between a relay node and a d-eNB, then a PDCCH (for transmitting an uplink grant 1021) in relay downlink backhaul subframe m is associated with a PUSCH transmission 1022 in a relay uplink backhaul subframe m+4. The PUSCH transmission in the relay uplink backhaul subframe m+4 is in turn associated with a PDCCH/PHICH in a relay downlink backhaul subframe m+8. When PDCCH/PHICH subframe timing in relay downlink backhaul collides with illegal downlink subframes 1010, PDCCH/PHICH cannot be received by the relay node.

In order to handle the collocation of PDCCH/PHICH subframe in relay downlink backhaul with the illegal downlink subframes 1010, an approach similar to Release 8 measurement gap procedure may be adopted. Such a procedure is illustrated in FIG. 11.

In FIG. 11, subframes with number 0, 4, 5 and 9 are illegal downlink subframes 1110, in which cannot be used as backhaul downlink 1101 subframes. In subframe 1 an uplink grant is transmitted from the d-eNB to the relay node. The corresponding data should be sent on PUSH from the relay node to the d-eNB four subframes later. The next backhaul downlink transmission would be another four subframes later, i.e., in the subframe number 9, which is an illegal downlink subframe. Thus, in subframe 1120 no feedback will be transported on PDCCH/PHICH. In order to handle this situation, the missed PHICH 1120 is interpreted as a positive acknowledgement (ACK), which triggers the suspension of the associated UL HARQ process. If necessary, an adaptive retransmission can be triggered later using PDCCH 1130. However, as a consequence of the missed PHICH, the associated relay uplink HARQ process loses the opportunity to transmit on the relay backhaul uplink when collision occurs. Within 40 ms, for each relay uplink HARQ process two collisions occur, which means that two uplink transmission opportunities are lost. In Release 8 UL synchronous HARQ protocol, if one uplink transmission opportunity is lost, the associated uplink HARQ process has to wait 8 ms for the next UL transmission opportunity. Thus, the Round Trip Time (RTT) 1140 is increased to 16 ms. This causes increase of the average RTT on relay uplink backhaul from 8 ms (as in Release 8) to (8 ms+16 ms+16 ms)/3=13.3 ms.

This problem with the increased round trip time may be solved by changing the system round trip time from 8 ms in Release 8 to 10 ms. Accordingly, the d-eNB sends ACK/NAK feedback on PHICH to the relay node 10 ms after the d-eNB sends the uplink grant to the relay node. This solution is illustrated in FIG. 12. An initial assignment (uplink grant) 1201 is transmitted from the d-eNB to the relay node. In response to the initial assignment 1201, four milliseconds later the relay node transmits data 1202 in its first transmission on PUSH to the d-eNB. The d-eNB provides an ACK/NAK feedback 1203 on PHICH six milliseconds later, i.e. in the subframe number 13. Upon receiving the ACK/NAK feedback 1203, the relay node may retransmit the data 1204 ten milliseconds after the first transmission. Thus, the round trip time 1210 of 10 ms is the new system round trip time fixed by the prescribed timing. Since an MBSFN subframe can be configured every 10 ms, there would be no collisions with the illegal downlink subframes and PDCCH/PHICH can always be received. Moreover, the average round trip time is equal to the system round trip time of 10 ms.

However, the solution described with reference to FIG. 12 also does not support the 40 ms periodicity of MBSFN configuration. This limits the scheduling of d-eNB and has also impact on the r-UEs.

SUMMARY OF THE INVENTION

The aim of the present invention is to overcome this problem and to provide an efficient retransmission protocol for data transmission between two nodes in a mobile communication system, the retransmission protocol having a possibly low average round trip time and a possibly small amount of required control signaling overhead.

This is achieved by the features of the independent claims.

Advantageous embodiments of the present invention are subject matter of the dependent claims.

It is the particular approach of the present invention to select the number of transmission processes for data transmission between two nodes in a mobile communication system based on the time intervals available for data transmission, and to map the transmission processes onto the available time intervals in a predefined order and periodically repeated fashion.

Such a configuration enables, for instance, an employment of a synchronous retransmission protocol for the uplink transmission in a relay. Due to the synchronous mapping of the transmission processes, the required control signaling overhead is kept low. Moreover, different patterns and timings of the time intervals available for transmission of data between the two nodes may be supported.

According to a first aspect of the present invention, a method for data transmission from a first node to a second node in a mobile communication system is provided. The method comprises determining positions of time intervals available for data transmission from the first node to the second node, selecting a number of transmission processes for transmitting data from the first node to the second node based on the determined positions of the available time intervals; and deriving the position of time intervals for transmitting the data belonging to the selected number of transmission process from the first node to the second node according to the position of the available time intervals and according to a mapping of the selected number of transmission processes onto the available time intervals in a predefined order in a cyclically repeating fashion, wherein a first transmission and any required retransmission of a single data portion are mapped to a single transmission process.

In particular, the retransmission protocol may be an uplink retransmission protocol including transmission of an uplink grant from the second node to the first node. The reception of an uplink grant triggers transmission of the uplink data from the first node to the second node. Moreover, the uplink retransmission protocol may include transmitting of feedback information such as a positive or a negative acknowledgement from the second node to the first node. The transmission of the uplink grant may be realized in the same time interval as the transmission of the feedback information. The transmission data may be either a data that is transmitted for the first time, or data that is retransmitted.

Preferably, the time intervals available for transmission of data from the first node to the second node are determined based on knowledge of the positions of the time intervals already reserved for transmission of data from the second node to the first node.

Preferably, the first node is a relay node and the second node is a (base station) network node. However, the present invention may be used for communication between any two nodes in a mobile communication system. For instance, the retransmission protocol may be used for communication between a terminal and a network node, or between arbitrary network nodes.

According to another aspect of the present invention, a data receiving node communicating with a data transmitting node in a mobile communication system using a retransmission protocol for data transmission from a data transmitting node to the data receiving node is provided. The data receiving node comprises a link control unit for determining position of time intervals available for data transmission from the data transmitting node to the data receiving node; a transmission control unit for choosing a number of transmission processes for transmitting data from the data transmitting node to the data receiving node based on the position of the available time intervals determined by the link control unit. The data receiving node further comprises a receiving unit for deriving the positions of time intervals for receiving the selected number of transmission processes according to the position of the available time intervals determined by the link control unit and according to a mapping of the number of transmission processes configured by the transmission configuration unit onto the available time intervals in a predefined and cyclically order. A first transmission and any required retransmission of a single data portion are mapped to a single transmission process.

According to another aspect of the present invention, a data transmitting node is provided for communicating with a data receiving node in a mobile communication system using a transmission protocol for data transmission from the data transmitting node to a data receiving node. The data transmitting node comprises: a link control unit for determining a position of time intervals available for data transmission from the data transmitting node to the data receiving node; a receiving unit for receiving from the data receiving node an indicator indicating a number of transmission processes to be applied for the transmission of data to the receiving node; a transmission configuration unit for configuring the number of transmission processes to the value signalled within the indicator; a transmitting unit for deriving the position of time intervals for transmitting data to the data receiving node according to the position of the available time intervals and by mapping of the received number of transmission processes onto the available time intervals in a predefined order and cyclically, wherein a first transmission and any required retransmission of a single data portion are mapped to a single transmission process; and judging unit for judging whether the number of transmission processes indicated by the indicator leads to a round trip time of data transmission for a transmission process to the receiving node lower than the minimum round trip time supported by the mobile communication system, wherein the data to be transmitted are user data and signalling data and when the judging unit judges positively, no transmission of user data to the receiving node takes place in those time intervals, which cause said round trip time for a transmission process to be lower than said minimum round trip time.

According to yet another aspect of the present invention, a data transmitting node is provided for communicating with a data transmitting node in a mobile communication system using a retransmission protocol for data transmission from a data transmitting node to the data receiving node. The data transmitting node comprises a link control unit capable of determining a position of time intervals available for data transmission from the data transmitting node to the data receiving node, and a retransmission control unit for configuring a number of transmission processes for transmitting data based on the positions of the available time intervals determined by the link control unit. The data transmitting node further comprises a transmitting unit for deriving the position of time intervals for transmitting data to the data receiving node according to the position of the available time intervals and by mapping of the number of transmission processes configured by the transmission configuration unit onto the available time intervals in a predefined and cyclically order. A first transmission and any required retransmission of a single data portion are mapped to a single transmission process.

Preferably, the number of transmission processes is selected so as to control the round trip time of the retransmission protocol or based on a message received from the data receiving node.

Still preferably, the data receiving node is a network node in more particular a base station and the data receiving node is a relay node. However, the data receiving node and the data receiving nodes may also be, respectively, any one of a network node, a relay node, or a communication terminal.

According to an embodiment of the present invention the number of transmission processes is selected according to predefined rules in the same way at both the data receiving node and the data transmitting node (the first and the second node).

According to another embodiment of the present invention, the number of transmission processes is determined at the data receiving node and signalled to the data transmitting node, for instance as an indicator.

Advantageously, the indicator can take a value for indicating that the first node shall determine the number of transmission processes implicitly, i.e. based on a minimum round trip time between the first node and the second node and based on available positions of time intervals available for data transmission from the first (data transmitting) node to the second node (data receiving). In particular, the indicator may take values such as integer numbers (which may be further binarized) directly representing the number of transmission processes. Another value, which can be out of the range for signalling the number of processes may then be reserved for signalling the implicit determination. It may be a value such as zero or a maximum number of processes allowed plus an offset (such as one), or a value that is designated as reserved. Such a signalling is advantageous since no separate indicator for implicit determination is required. However, the present invention is not limited thereto and, in general, a separate indicator may be signalled as well. Alternatively, the implicit determination may be triggered by a particular setting of other parameters.

The positions of the available time intervals may also be signalled from the second node to the first node. Alternatively, it may be determined from another signal from the second node to the first node. For example, the second node may signal the available time intervals for transmissions from the second node to the first node. From this, the available time intervals for transmission from the first node to the second node can be determined by applying an offset, which is preferably an integer number of time intervals.

Preferably, the number of transmission processes is configured as the smallest number of transmission processes leading to the round trip time of data transmission from between the two nodes (data transmitting and data receiving) not lower than the minimum round trip time supported by the mobile communication system for data transmission between the two nodes.

The round trip time of one transmission process of the retransmission protocol is defined as the time between two consecutive transmission opportunities for the same transmission process. The minimum round trip time is a system parameter derived based on the processing time requirements of the communicating nodes.

According to still another embodiment of the present invention, the data transmitting node is a relay node and the data receiving node is a network node and the position of time intervals available for data transmission from the relay node to the network node is determined based on the timing of uplink transmission processes between communication terminal and the relay node (on relay access uplink). In particular, the relation of the relay access uplink timing to the timing of available time intervals on the relay uplink is taken into account.

Preferably, on the relay access uplink the transmission processes are identified, the receiving time interval of which overlaps with any of time intervals that can be configured as time intervals available for data transmission on the relay uplink backhaul. The process number of these identified processes is determined. As time intervals available for data transmission then the time intervals are selected, which overlap with a limited number of process numbers of uplink transmission processes between the relay node and a communication terminal in order to limit the number of the uplink transmission processes being delayed. In particular, the time intervals may be selected, which overlap with the smallest number of affected processes.

Preferably, the position of the time intervals for transmitting of uplink grants for data transmission and/or time intervals for transmitting of feedback information is determined based on the position of time intervals for transmitting data from the relay node to the network node.

Advantageously, the mobile communication system is a 3GPP LTE system or its enhancements, the first node is a relay node, the second node is a nodeB and the indicator is transmitted within the RRC signalling related to backhaul subframe configuration. Furthermore, the time intervals may correspond to the subframes of the 3GPP LTE system.

According to an embodiment of the present invention, at the first node, the number of transmission processes is configured to the value signalled within the indicator. Still at the first node it is judged whether the number of transmission processes indicated by the indicator leads to a round trip time of data transmission for a transmission process from the first node to the second node being lower than the minimum round trip time supported by the mobile communication system for data transmission from the first node to the second node, wherein the data to be transmitted are user data and signalling data, and, when the judging step judges positively, no transmission of user data from the first node to the second node takes place in those time intervals, which cause said round trip time for a transmission process to be lower than said minimum round trip time.

The "no transmission" may only relate to the user data, which is advantageous since the control information (signalling) such as feedback information may still be transmitted in order to be provided as soon as possible. Alternatively, the "no transmission" may also apply for signalling data. The "no transmission" may refer to the fact that no user data and/or signalling data are transmitted. Advantageously, discontinuous transmission may be used when no user data and signalling data are transmitted; the transmitting circuitry is switched off.

Moreover, the mapping of transmission processes is performed by cyclically mapping the selected number of processes onto the available time intervals for transmission from the first node to the second node. After this mapping, the time intervals are determined, in which there is no transmission of user and/or signalling data. Thus, the mapping of processes onto available time intervals does not specially handle the time intervals in which no transmission is to take place. After the mapping, the time intervals which, for a particular transmission process, lead to a too small round trip time shall not be used for the transmission of that particular process. Other processes or time intervals for said process that observe the minimum round trip time remain unaffected.

The transmission of data from the first node to the second node may include transmitting acknowledgements for data received from the second node at the first node, transmission of the acknowledgements taking place in time intervals located a fixed number of time intervals after the transmission of said data, and the acknowledgements located in those time intervals in which no transmission takes place may be bundled or multiplexed with another acknowledgement sent in a different time interval. Bundling or multiplexing provides an efficient way to utilize one feedback opportunity to communicate feedback data related to different transmission processes. This is especially advantageous when discontinuous transmission is employed where a transmission opportunity may be lost.

In accordance with still another aspect of the present invention, a mobile communication system is provided, comprising a network node apparatus according to the present invention and a relay apparatus according to the present invention. The system may further comprise one or more mobile terminals capable of communicating with the relay node apparatus. Such a system is capable of configuring an uplink retransmission protocol according to the present invention and of transmitting data accordingly.

According to still another aspect of the present invention, a method is provided for receiving data at a receiving node using a retransmission protocol for data transmission between two nodes in a communication system. First, positions of time intervals available for data transmission between the two nodes are determined. Based thereon, a number of transmission processes for transmitting data from the data transmitting node to the data receiving node is selected. The positions of time intervals for receiving the selected number of transmission processes for data transmission from the data transmitting node are derived according to the position of the available time intervals and according to a mapping of the selected number of transmission processes onto the available time intervals in a predefined and cyclically order.

A first transmission and any required retransmission of a single data portion are mapped to a single transmission process.

According to yet another aspect of the present invention, a method is provided for transmitting data from a data transmitting node using a retransmission protocol for data transmission to a data receiving node in a mobile communication system. Positions of time intervals available for data transmission are determined. Accordingly, a number of transmission processes for transmitting data from the transmitting node to the receiving node is selected. The positions of time intervals for transmitting data to the network node are derived according to the position of the available time intervals and by mapping of the configured number of transmission processes onto the available time intervals in a predefined and cyclical order.

In accordance with yet another aspect of the present invention, a computer program product is provided which comprises a computer readable medium having a computer readable program code embodied thereon, the program code being adapted to carry out any embodiment of the present invention.

The above and other objects and features of the present invention will become more apparent from the following description and preferred embodiments given in conjunction with the accompanying drawings, in which:

FIG. 2 is a schematic drawing illustrating 3GPP LTE architecture of the radio access network E-UTRAN;

FIG. 7 is a schematic illustration of timing of the uplink HARQ in 3GPP LTE;

FIG. 8 is a schematic illustration of 3GPP LTE architecture with a donor NodeB and a relay node;

Figure 1:
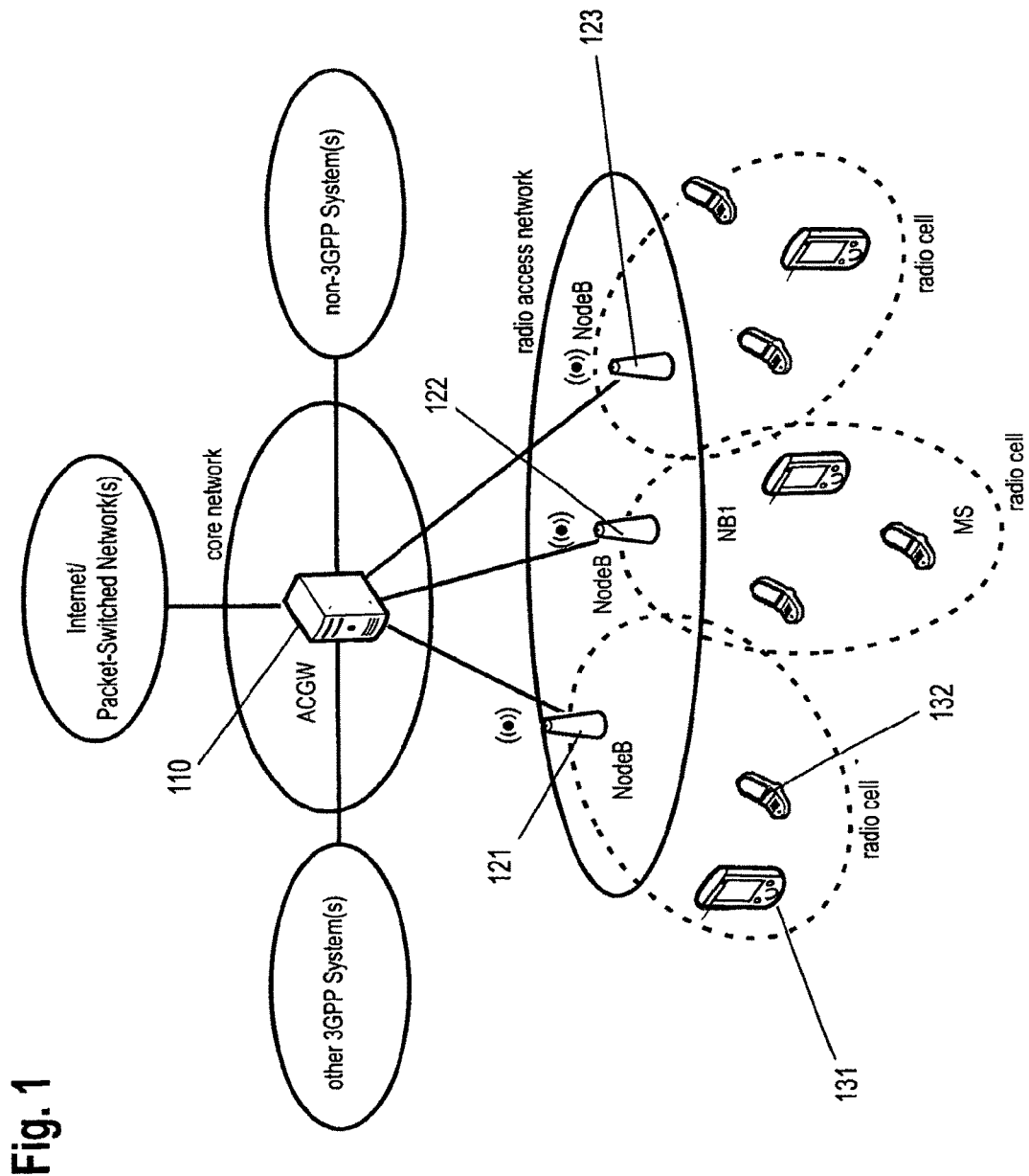
FIG. 1 is a schematic drawing illustrating 3GPP LTE architecture.
Figure 3:
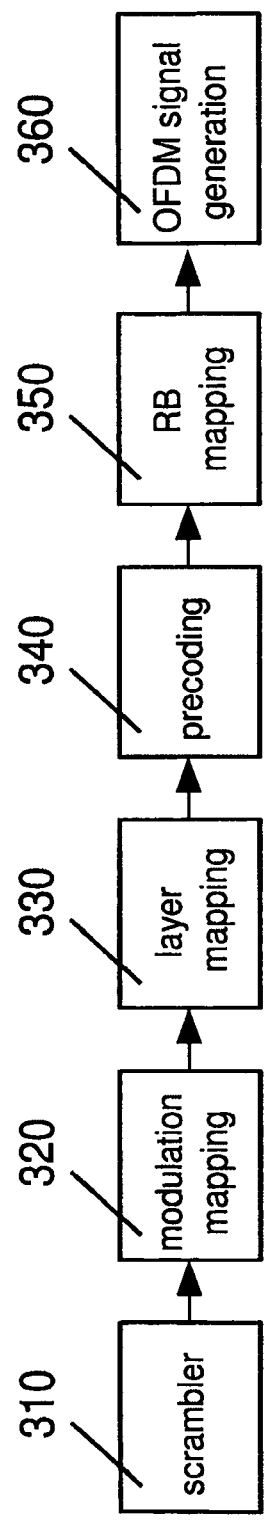
FIG. 3 is a block diagram illustrating downlink baseband processing in LTE system.
Figure 4:
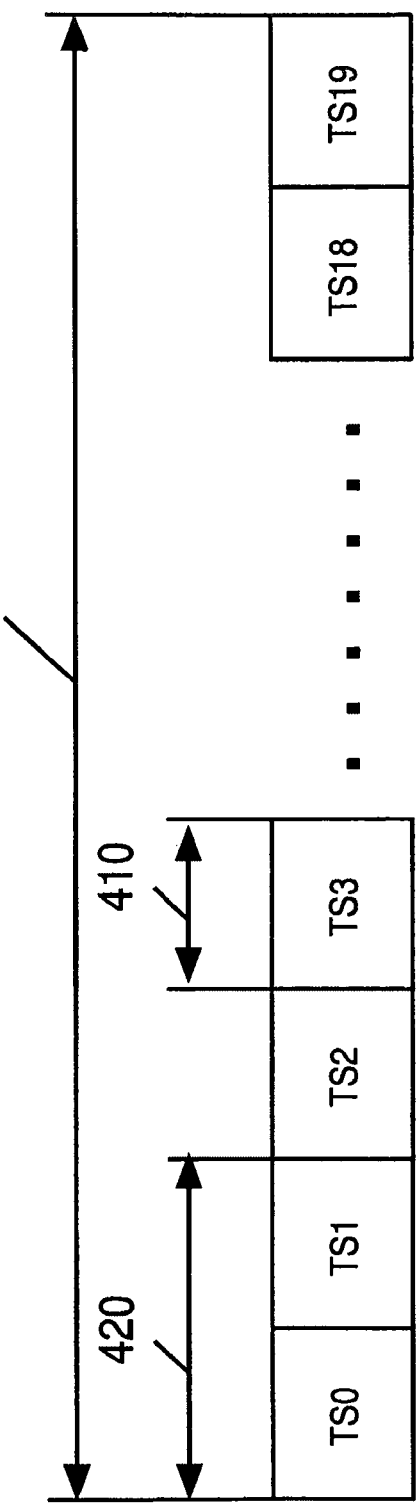
FIG. 4 is an illustration of radio frame structure for LTE FDD system.
Figure 5:
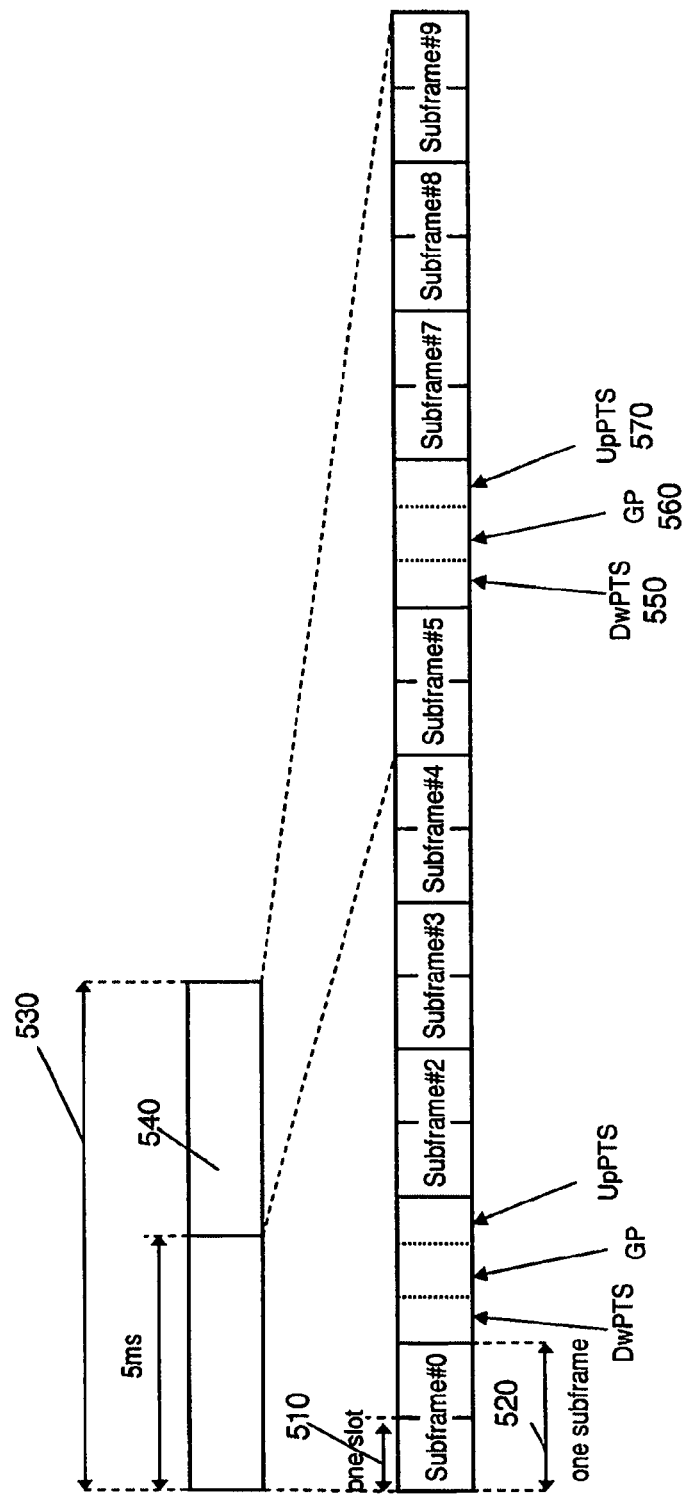
FIG. 5 is an illustration of radio frame structure for LTE TDD system.
Figure 6:
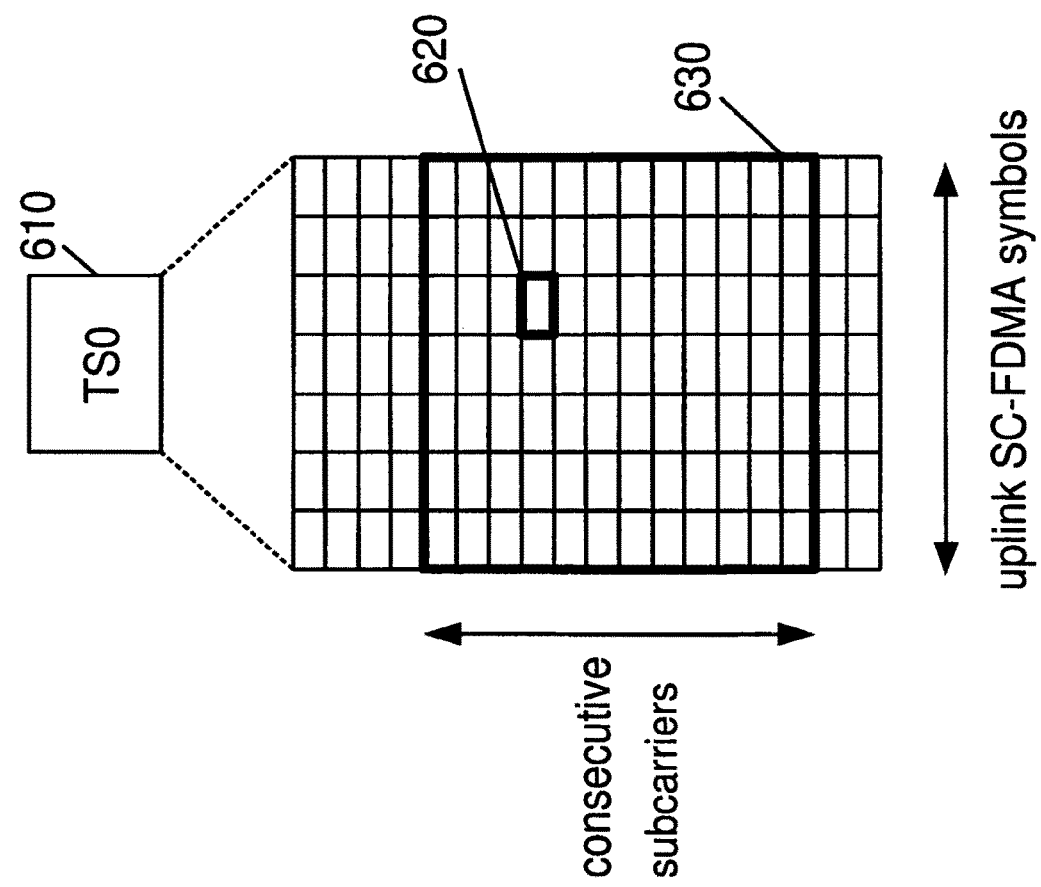
FIG. 6 is an illustration of physical resources in a time-frequency grid for uplink LTE.
Figure 9:
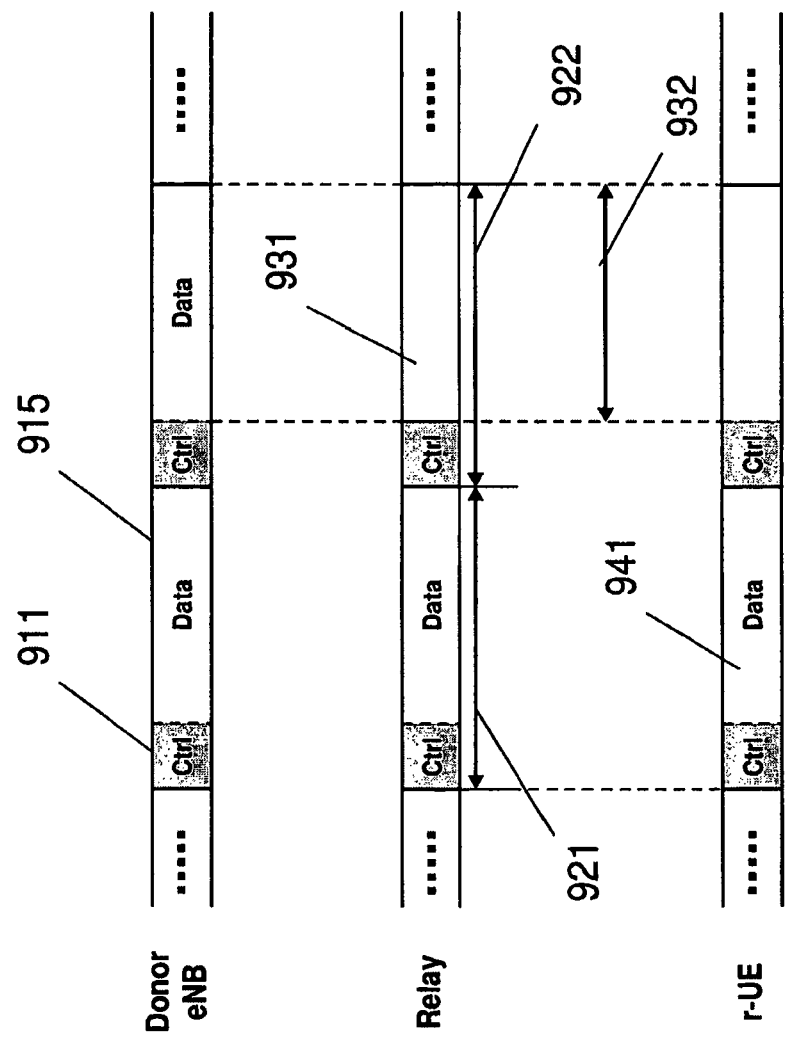
FIG. 9 is a schematic illustration of the relay backhaul downlink subframe structure in LTE-A.
Figure 10:
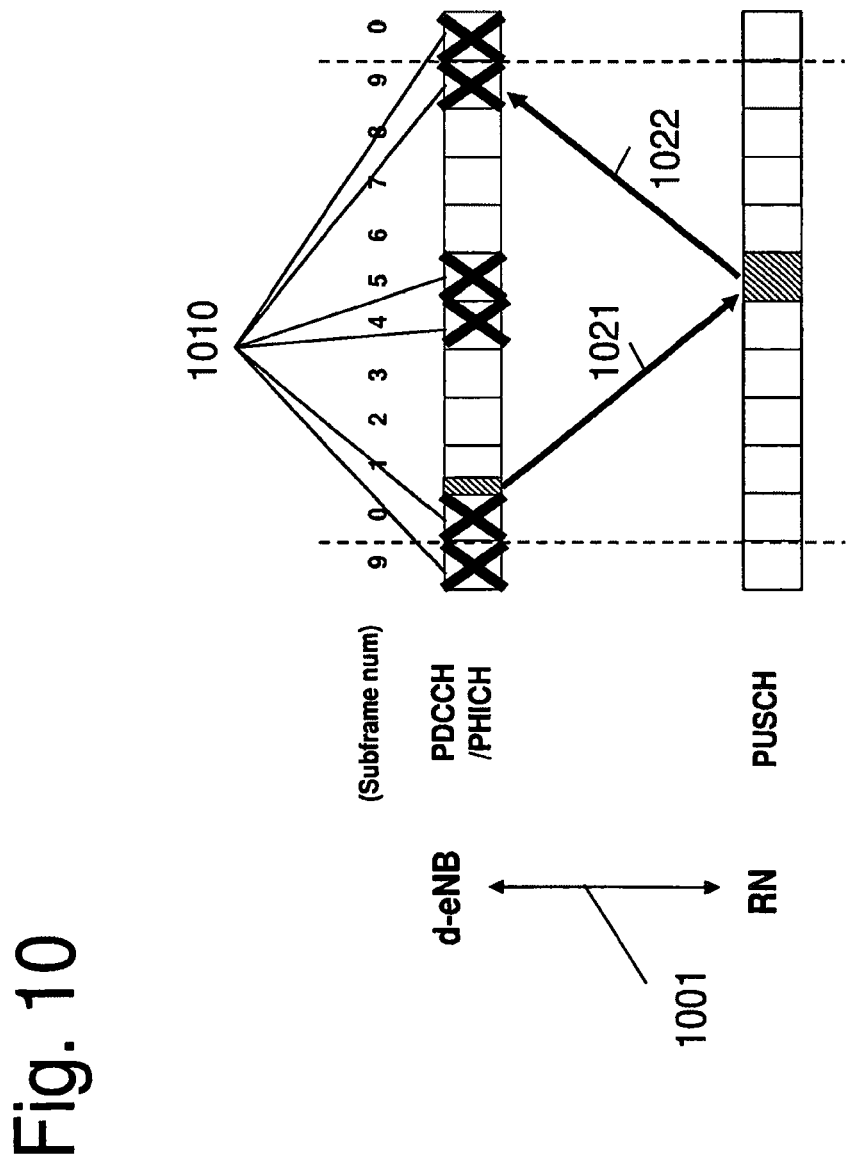
FIG. 10 is a schematic illustration of an example relay backhaul uplink HARQ timing for the case, in which Release 8 LTE uplink HARQ is applied to the relay backhaul link in LTE-A.
Figure 11:
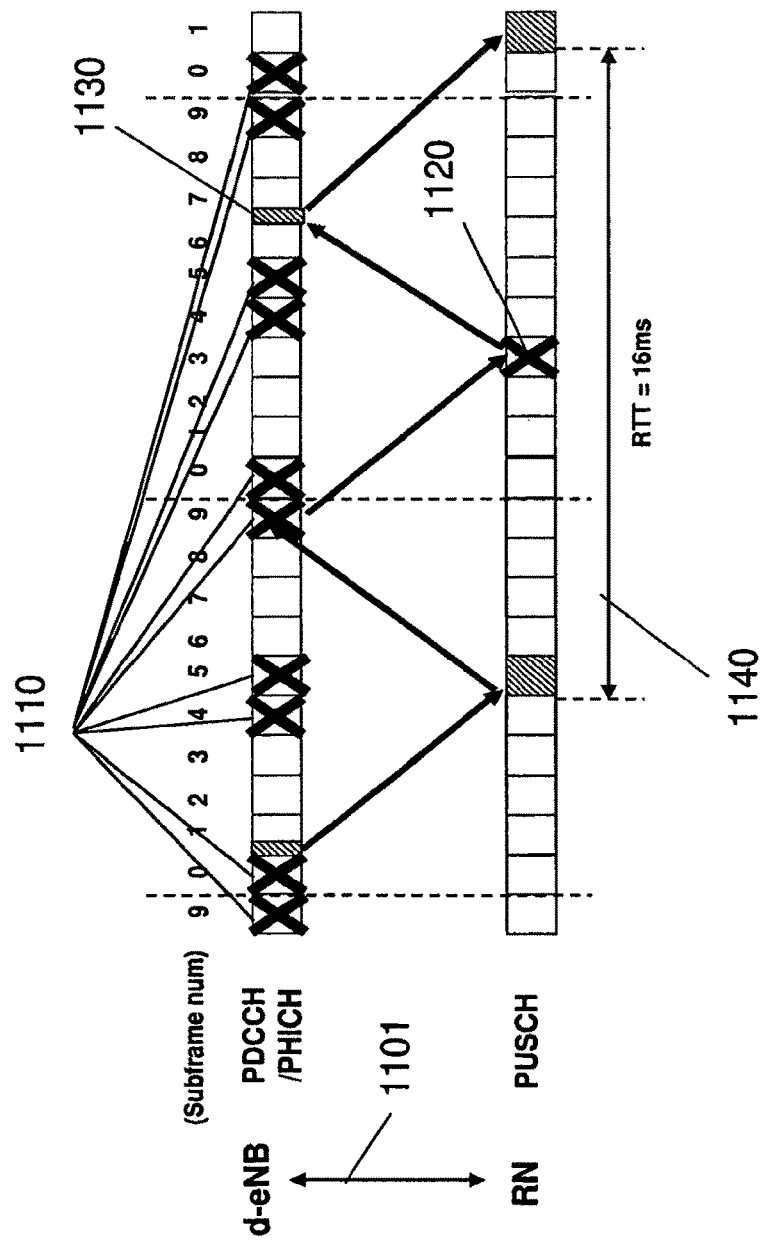
Figure 12:
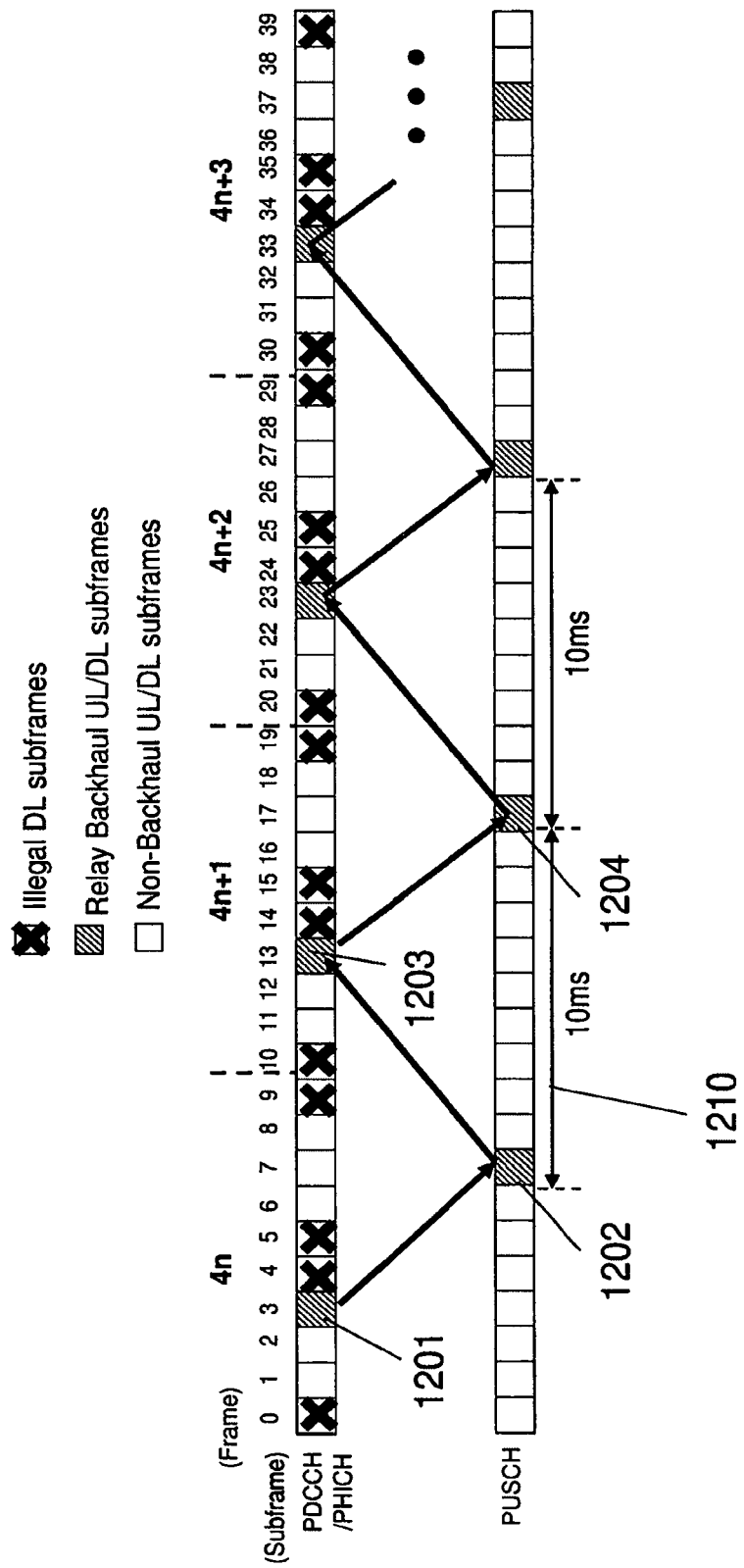
Figure 13:
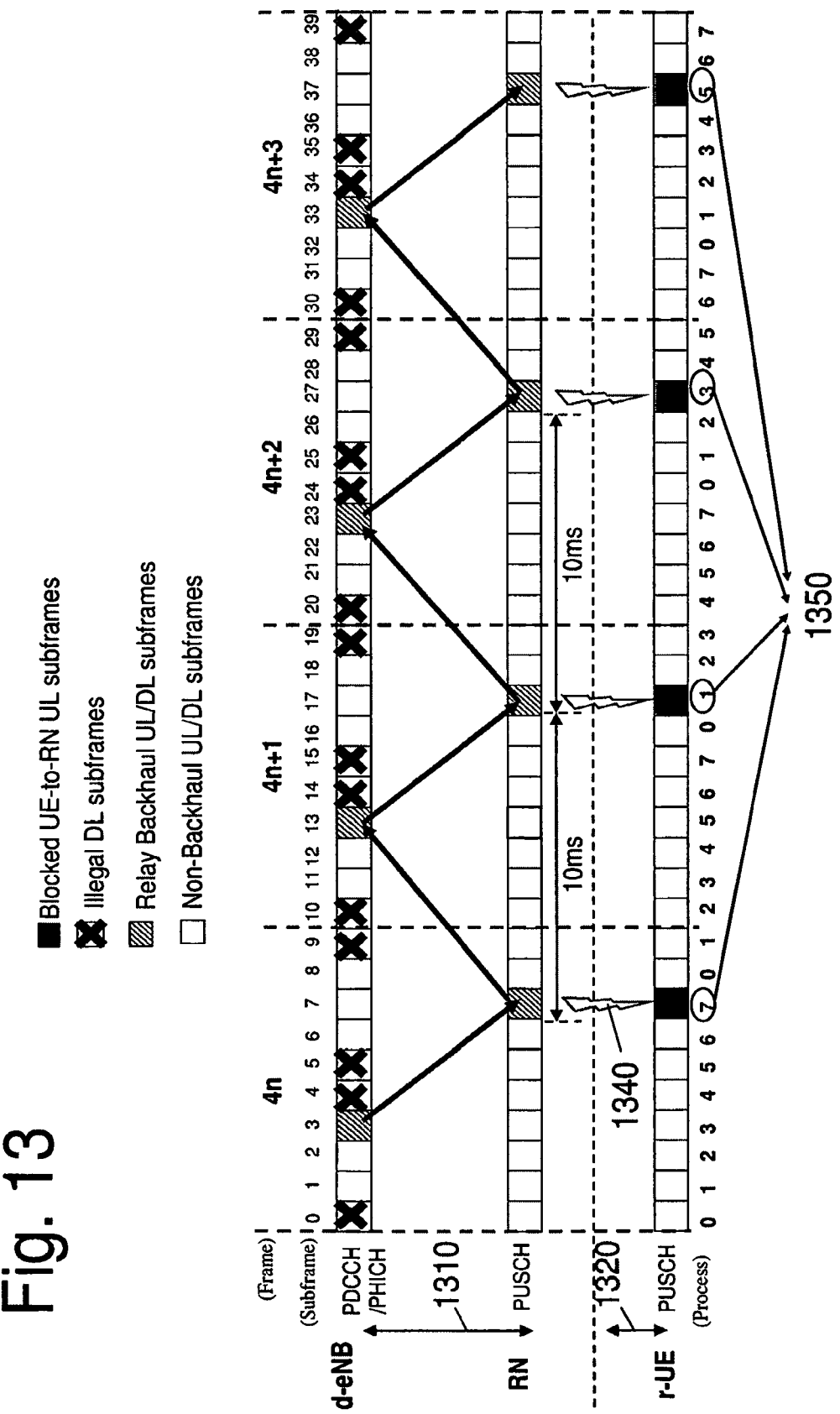
Figure 17:
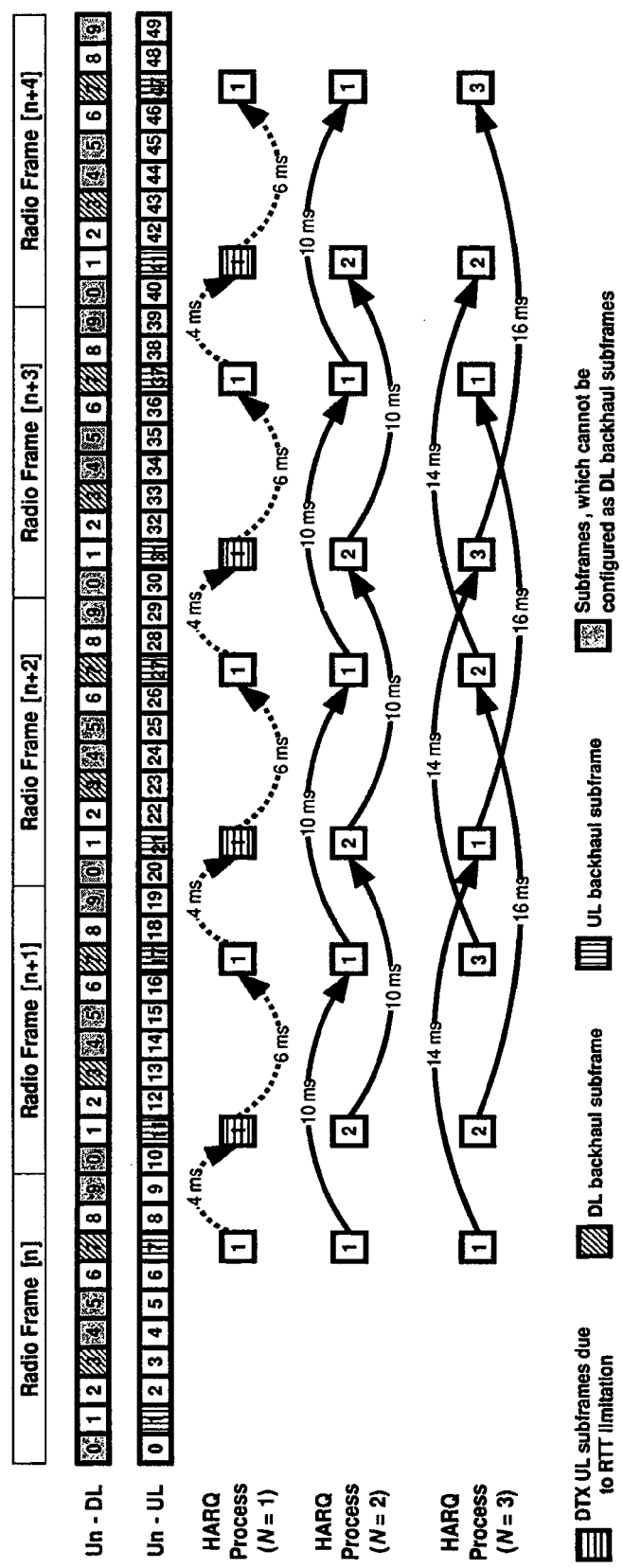
Figure 18:
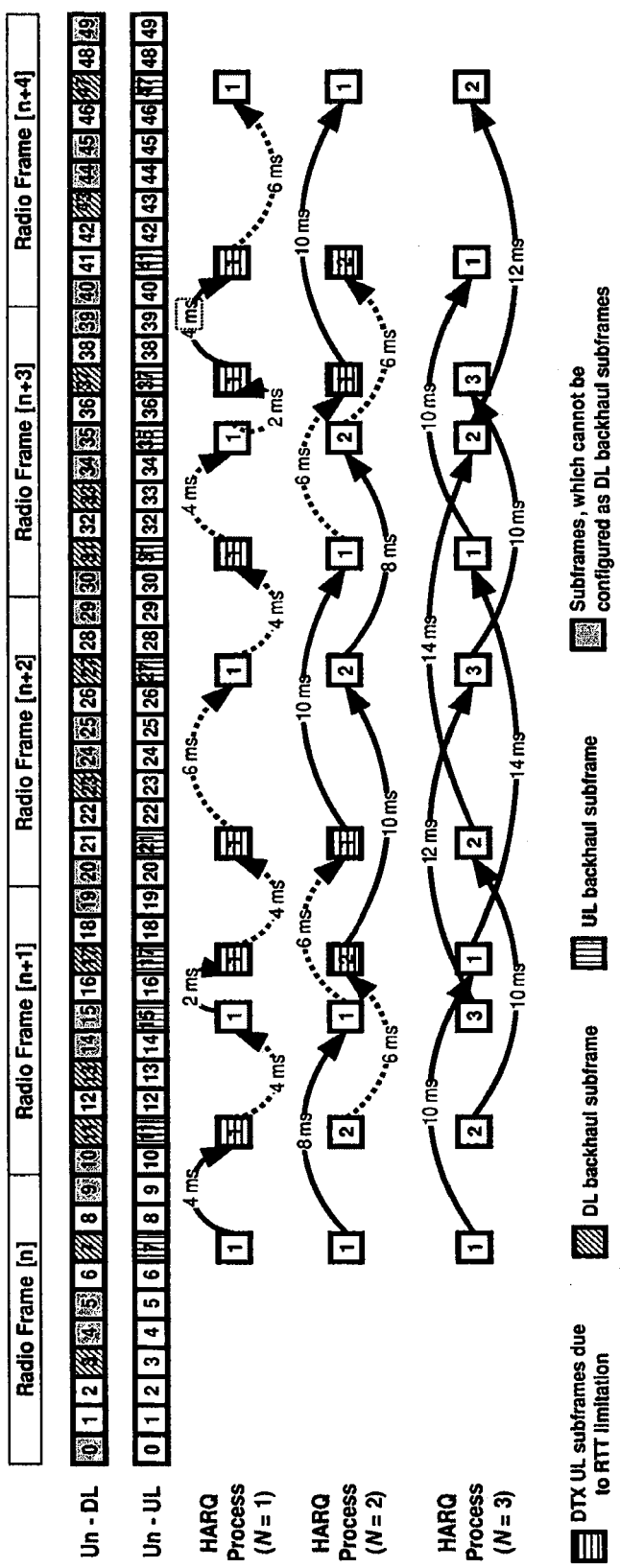
Figure 19:
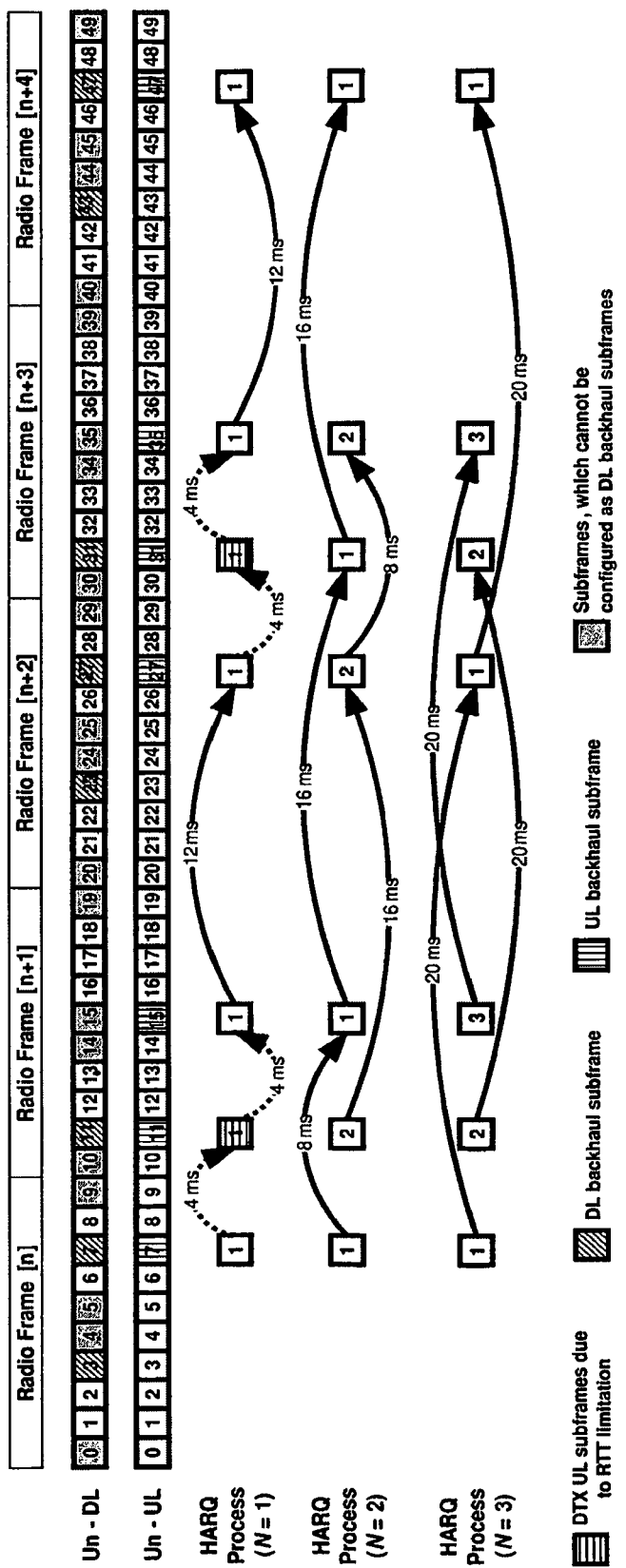
Figure 20:
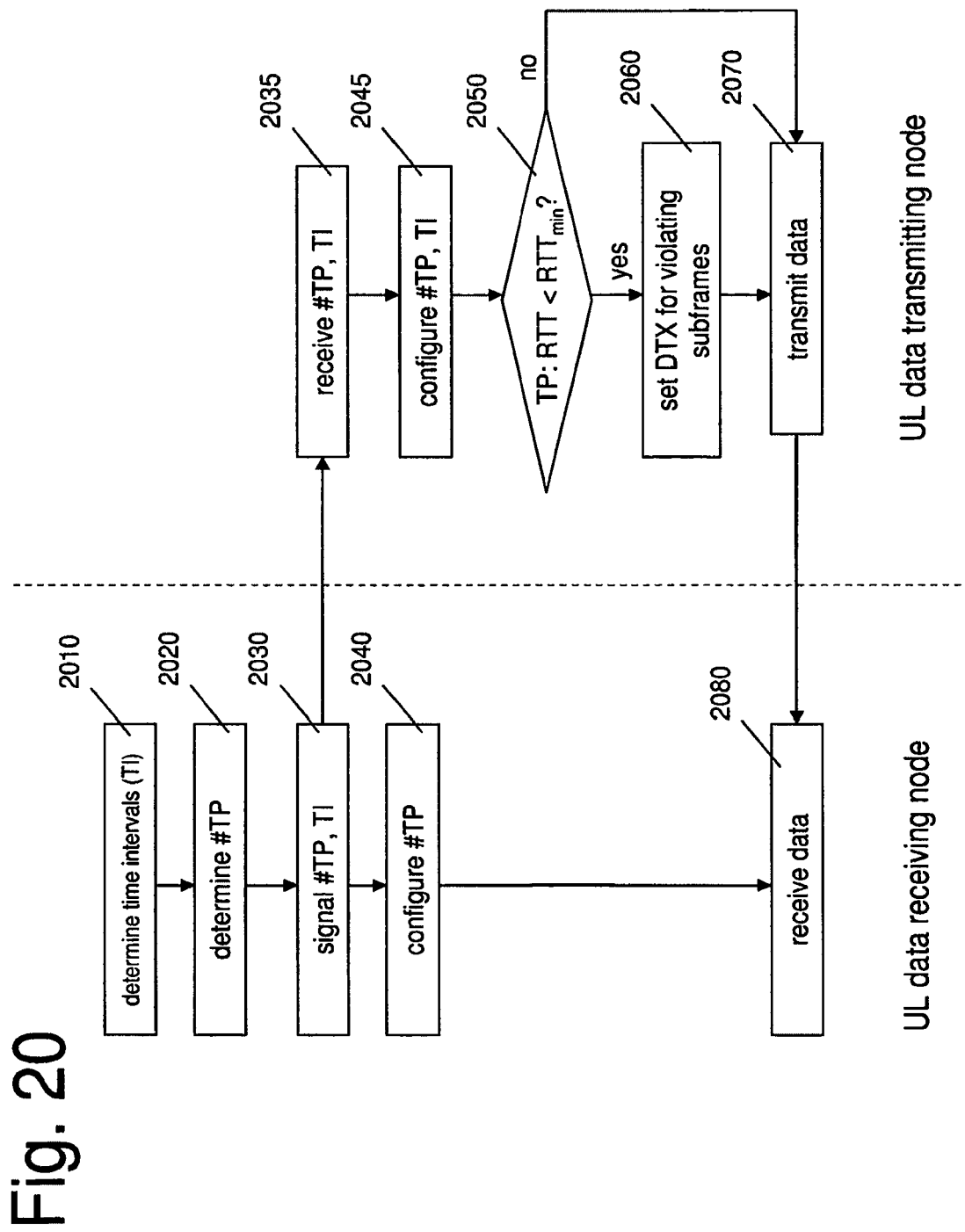

FIG. 11 a schematic illustration of another relay backhaul uplink HARQ timing for the case, in which Release 8 LTE uplink HARQ is applied to the relay backhaul link in LTE-A;

FIG. 12 a schematic illustration of relay backhaul uplink HARQ timing with 10 ms round trip time;

FIG. 13 is a schematic drawing illustrating showing the relation between the timing of the relay backhaul link with the HARQ of 10 ms round trip time and the relay access link;

FIG. 14 is a schematic drawing illustrating of the backhaul uplink HARQ in accordance with the present invention;

FIG. 15A is a schematic drawing illustrating mapping of one HARQ process on relay uplink backhaul subframes for different numbers of processes;

FIG. 15B is a schematic drawing illustrating mapping of two HARQ processes on relay uplink backhaul subframes for different numbers of processes;

FIG. 15C is a schematic drawing illustrating mapping of three HARQ processes on relay uplink backhaul subframes for different numbers of processes;

FIG. 16 is a schematic drawing showing a system including a network node and a relay node in accordance with the present invention;

FIG. 17 is a schematic drawing illustrating an example of mapping different numbers of HARQ processes on backhaul uplink assuming a first configuration of Un downlink and uplink transmission;

FIG. 18 is a schematic drawing illustrating an example of mapping different numbers of HARQ processes on backhaul uplink assuming a second configuration of Un downlink and uplink transmission;

FIG. 19 is a schematic drawing illustrating an example of mapping different numbers of HARQ processes on backhaul uplink for a third configuration of Un downlink and uplink transmission; and FIG. 20 is a flow diagram illustrating the methods performed at the data transmitting and data receiving node according to an embodiment of the present invention.

DETAILED DESCRIPTION

The present invention relates to communication in a wireless mobile system on the link between two nodes, in particular, to configuration of a retransmission protocol for data transmission between the two nodes.

The problem underlying the present invention is based on the observation that a relay node cannot transmit and receive at the same time in one frequency band. This results in limitations of a choice of the time intervals available for the transmission of data from the relay node to the network node. Such limitations may lead to an increased average round trip time, especially in case of a synchronous retransmission protocol applied to the backhaul uplink. However, a synchronous retransmission protocol has an advantage of implicitly derived timing leading to low signaling overhead.

The problem underlying the present invention may occur for any two nodes in a communication system and the present invention may thus be applied to any two nodes in a communication system, not only to a network node and a relay node, which have been chosen only as an example. The problem with irregular (within a certain time period such as a frame or a number of frames) distribution of available time intervals may also occur in transmission between two network nodes, or between a network node and a terminal, or between a relay node and a terminal, etc. Furthermore, a relay node may in general also incorporate functions of a network node.

The present invention provides an efficient mechanism for transmitting data using a retransmission protocol between a first node and a second node even for the case in which the available time intervals for the transmission are irregularly distributed. The number of transmission processes is selected and their mapping to time intervals available for transmission of the uplink data is defined. In particular, the number of transmission processes is determined based on the location of available time intervals. The transmission processes are mapped (HARQ processes) in a predefined order and repeated cyclically on the available time intervals. Based on the selected number of transmission processes and based on the resulting transmission process mapping, the time intervals for uplink transmission and reception of scheduling related control signaling (including ACK/NAK) may be determined.

The number of transmission processes may be selected also in order to control the round trip time between the two nodes.

Round trip time is a time needed for a signal transmitted from a sender to arrive at the receiver and returning back. The round trip time of one transmission process of the retransmission protocol is defined as the time between two consecutive transmission opportunities for the same transmission process. In synchronous retransmission protocols, the minimum round trip time is defined by the synchronous timing. For instance, in the retransmission protocol illustrated in FIG. 11, the value of minimum round trip time is 8 ms, corresponding to the time between the first transmission of data from relay node (RN) on PUSCH and the feedback on PHICH/PDCCH send 4 ms later plus the fixed time of 4 ms between this feedback information and the transmission of further data (either retransmission of the transmitted data or a first transmission of other data). These fixed response times are typically chosen with regard to the processing capabilities of the communication nodes, for instance, by considering the time needed for receiving, demultiplexing, demodulating, decoding and evaluating of the transmitted information as well as the time for preparing and sending an appropriate response (possibly including coding, modulating, multiplexing, etc.). As can be seen from FIG. 11, the real round trip time even for a synchronous retransmission protocol may differ from the minimum round trip time in particular cases. Thus, an average round trip time may be used as a measure for delay on a link.

FIG. 15A shows subframes of a PUSCH for uplink transmission of data from a relay node to a donor eNB. Subframes with numbers 1 and 7 (numbered starting from 0) are available for transmission of the data from the relay node to the donor eNB. The single HARQ process denoted "P1" is mapped in accordance with the present invention onto each available subframe, resulting in a smallest achievable round trip time 1501 of four-subframe duration, which corresponds in LTE-A to 4 ms. A longer round trip time of 6 ms also occurs in this mapping scheme.

FIG. 15B illustrates mapping of two transmission processes denoted "P1" and "P2" onto the available subframes in accordance with the present invention. The two processes are mapped alternately, i.e. in the fixed order P1, P2 and cyclically. This mapping results in a smallest achievable round trip time 1502 of 8 ms corresponding to duration of 8 subframes. The longer round trip time resulting from this mapping is 12 ms.

FIG. 15C illustrates mapping of three transmission processes denoted "P1", "P2", and "P3" onto the same available subframes as in FIGS. 15A and 15B. The three processes are mapped in a fixed order P1, P2, P3 periodically onto the available subframes. This leads to a smallest achievable round trip time of 14 ms. The longer round trip time resulting from this mapping is 16 ms.

Thus, according to the present invention a control of the round trip time in a retransmission protocol is enabled by means of configuring the number of transmission processes, since the mapping of the processes onto the available subframes is specified in the present invention.

Preferably, the smallest round trip time of a transmission process such as 1501, 1502, 1503 is to be configured larger than or equal to the minimum round trip time supported by the system. In LTE-A backhaul uplink, the minimum round trip time is given by the system to allow enough processing time for the d-eNB and the relay node. A synchronous uplink protocol respecting the limitations posed by the minimum round trip time may be supported providing thus enough time for processing in the nodes involved in communication. In the examples shown by the figures, the minimum round trip time is assumed to be 8 ms. As can be seen from FIG. 15A, mapping a single transmission process on the available subframes does not fulfil the condition that the smallest round trip time should be larger than or equal to the minimum round trip time given by the system; the smallest round trip time is 4 ms, which is less that the minimum round trip time of 8 ms supported by the system. As can be seen from FIGS. 15B and 15C, both these configurations result in the smallest round trip time equal to (cf. 8 ms in FIG. 15, two processes) or larger than (cf. 14 ms of FIG. 15C, three processes) the minimum system round trip time. Similarly, each higher number of transmission processes (four and more) fulfils the condition.

In accordance with an embodiment of the present invention, the number of transmission processes is selected in such a way that the resulting round trip time is as small as possible, but larger than the minimum system round trip time. This enables reducing the average round trip time on the relay uplink backhaul. Moreover, once the rule for mapping the transmission processes is adopted on the relay uplink backhaul, this rule for selecting the number of transmission processes may be followed by both d-eNB and relay node, since they both have to be aware of the configuration of time intervals available for the uplink transmission from the relay node to the d-eNB. Such an implicit deriving of number of processes at both relay node and the d-eNB has further the advantage of no-additional overhead needed for signaling the number of processes.

Referring to FIGS. 15A, 15B, and 15C, according to this embodiment of the present invention, based on the available subframes number 1 and 7, the configuration shown in FIG. 15B would be selected, supporting two transmission processes.

The processes P1, P2, and P3 denote transmission processes with an arbitrary process number. The order of transmission processes is preferably consecutive. However, the present invention is not limited thereto and an arbitrary ordering of the transmission processes would be possible.

Another advantage of the present invention is the possibility to maintain a synchronous uplink HARQ, which is efficient, since the amount of explicit signaling is minimized. In particular for the example of LTE-A, the PUSCH transmission on each relay uplink backhaul subframe is associated with a single uplink HARQ process identification (number). The timing relation between the PDCCH uplink grant and PUSCH transmission on relay backhaul and corresponding feedback on PHICH/PDCCH may be derived by the relay node and the network node (d-eNB) depending on the configuration of the available subframes.

It is agreed in 3GPP RAN1 group that, relay uplink backhaul subframes are semi-statically configured or implicitly derived by HARQ timing from the downlink backhaul subframes. If uplink backhaul subframes are implicitly derived by HARQ timing from downlink backhaul subframes, the timing relation between the PDCCH/PHICH and PUSCH transmission is defined in the specification (for instance, 4 ms in Release 8 LTE) or by a configurable parameter.

If the available uplink backhaul subframes are semi-statically configured (for instance, by RRC protocol at the d-eNB), the timing relation between PDCCH/PHICH and PUSCH transmission should be derived so that it is longer than the processing time at eNB and as small as possible in order to reduce the delay.

The present invention may be advantageously used for example in connection with a mobile communication system such as the LTE-Advanced (LTE-A) communication system previously described. However, the use of the present invention is not limited to this particular exemplary communication network. It may be advantageous for transmitting and/or receiving of data signal and control signal over any standardized mobile communication system with relaying nodes, any evolved versions of such a standardized mobile communication, any future mobile communication systems to be standardized or any proprietary mobile communication system.

In general, the present invention enables controlling the round trip time by means of configuring the number of transmission processes on the uplink between the relay node and the network node. Once the number of processes is determined and the mapping of the transmission processes onto the available time intervals is applied, the time relation between the uplink data transmission, feedback and grant for transmission may be fixedly defined or derived based on the pattern of available time intervals.

Thus, a synchronous uplink retransmission protocol may be supported and the average round trip time is controlled by the present invention. Moreover, a full flexibility of 40 ms periodicity configuration for relay downlink backhaul subframes can be supported.

According to another embodiment of the present invention, the number of transmission processes is configured in the network node and explicitly signaled to the relay node. The relay node determines the number of transmission processes from an indicator received from the network node. This solution requires signaling of the number of processes. However, it also provides advantages. For instance, the complexity and testing effort can be reduced at the relay node. Moreover, signaling of the number of transmission processes allows for a more flexible controlling the round trip time. A longer round trip time may be supported by increasing the number of uplink transmission processes on the uplink between the relay node and the network node. A shorter round trip time may be supported by reducing the number of uplink transmission processes. Even a round trip time smaller than a minimum system round trip time may be selected if possible from the point of view of implementation of the network node and the relay node processing.

Currently, it has been agreed in 3GPP RAN1 group that relay downlink backhaul subframes are semi-statically configured and relay uplink backhaul subframes are semi-statically configured or implicitly derived by HARQ timing from downlink backhaul subframes as described above.

Moreover, when a relay node transmits data to a network node, it cannot at the same time receive data from a mobile station. This leads to limitations of available subframes on both access link (the link between a relay node and a mobile terminal) and backhaul link (the link between a relay node and a network node). As a consequence, the average round trip time increases and the transmission processes on the uplink between the mobile terminal and the relay node may lose their chance for transmission. This results in delay of the affected processes and thus, in an overall performance degradation.

All retransmission mechanisms discussed above have such an impact on the uplink between the mobile terminal and the relay node.

FIG. 13 illustrates this problem based on the example of the 10 ms-RTT solution for LTE-A described above with reference to FIG. 12. A time-division based relay node cannot transmit and receive at the same time in one frequency band. When such a relay transmits to the d-eNB, it cannot receive at the same time from the attached r-UEs. Consequently, the associated uplink HARQ processes in r-UEs lose their chance for transmission. FIG. 13 shows both, the relay backhaul link 1310 similar to the relay backhaul link of FIG. 12 and the relay access link 1320 with eight HARQ processes configured. An arrow 1340 points to the impacted HARQ processes, where the r-UE cannot transmit to the relay node since the relay node transmits to the d-eNB. According to the 10 ms-RTT solution, always a different uplink HARQ process number in the r-UEs is impacted. As can be seen in FIG. 13, at least the half (four) of the uplink HARQ processes 1350 are impacted and suffer from a longer delay of 16 ms since with eight configured processes the next chance to transmission is 8 ms later. When four or more than four subframes are configured per 10 ms on relay uplink backhaul, all eight uplink HARQ processes in r-UEs are delayed. In such a case, it is impossible for the relay node to smartly schedule delay critical data on a non-delayed uplink HARQ process in r-UEs.

In order to overcome this problem, in accordance with still another embodiment of the present invention, the timing of the uplink transmission processes between the mobile station (r-UE) and the relay node is taken into account when configuring the available time intervals (subframes) for the uplink transmission between the relay node and the network node. The general idea is to configure the available uplink backhaul time intervals in such a way that a smaller number of uplink retransmission (HARQ) processes on the uplink between a mobile terminal and the relay node are delayed.

FIG. 14 illustrates such a mechanism. Transmission process P1 on the backhaul uplink is mapped to the available time intervals on PUSCH in such a way that only two transmission processes on the uplink access link are affected, namely the transmission processes 1450 with process number 3 and 7. Thus, only limited transmission processes on the uplink between the mobile terminal and the relay node will have a longer delay. So the relay node may, for instance, schedule delay critical data on those non-delayed transmission processes and schedule delay non-critical data on those delayed transmission processes.

Thus, according to this embodiment of the present invention, the configuration of the time intervals for transmitting the data from the relay node to the network node may be performed so as to affect smaller number of processes on the access link. In order to facilitate such a configuration, the network node may first determine the process number of the access transmission processes (between the mobile terminal and the relay node) to be overlapped with time intervals for transmission of data in uplink from the relay node to the network node. Based thereon, time intervals are selected available for transmission in the relay backhaul uplink that overlap with a lowest possible number of process numbers of the transmission processes on the access link. In general, the available time intervals selected does not need to lead to a lowest possible number of process numbers affected on the access link. The mechanism of this embodiment may also be used just for lowering the number of affected processes on the access or for ensuring that certain process numbers are not delayed.

The main advantage of the present embodiment is the resulting lower impact of the backhaul transmission (transmission between the relay node and the network node) on the access transmission (transmission between the mobile terminal and the relay node). This mechanism may be employed in addition to the present invention related to configuring the number of transmission processes and their mapping on the available time intervals. However, such a mechanism may also be applied to any other system allowing for configuration of available time intervals for transmission of data between a relay node and a network node.

The present invention has been described based on examples of a retransmission protocol for 3GPP LTE-A system. Two downlink signaling channels associated with the uplink data transmission on the backhaul link between a network node and a relay node have been described: PHICH and PDCCH. However, the proposed backhaul uplink HARQ protocol can operate without PHICH. In order to facilitate this, PDCCH is used to indicate positive or negative acknowledgements (ACK/NAK) for the configured HARQ processes.

In more detail, the LTE HARQ mechanism employs a PDCCH at an expected feedback time for a given transmission process (or a given data unit) to trigger either a transmission of a new data unit or the retransmission of an old data unit by means of the PDCCH content. In absence of a PDCCH at an expected feedback time for a given transmission process (or a given data unit), the PHICH at that same time is responsible to give a short efficient feedback that either triggers a retransmission of an old data unit (usually associated with PHICH=NACK) or that triggers a suspension mode in which the data transmitter is waiting for an explicit new command by PDCCH at a later point of time (usually associated with PHICH=ACK). In case the mechanism is changed such that there is no PHICH or equivalent feedback signal existing in the protocol, the following embodiment can be beneficially employed. As before, a PDCCH at an expected feedback time for a given transmission process (or a given data unit) is triggering either a transmission of a new data unit or the retransmission of an old data unit by means of the PDCCH content. The absence of a PDCCH at an expected feedback time for a given transmission process (or a given data unit) triggers a suspension mode in which the data transmitter is waiting for an explicit new command by PDCCH at a later point of time.

In case that it is desirable to implement the mechanism without PHICH signals into a protocol or entity that expects the existence of PHICH, in a further embodiment the absence of a PDCCH at an expected feedback time for a given transmission process (or a given data unit) is triggering the same behavior as the reception of a PHICH=ACK signal at that same time. In other words, the detection of PHICH=ACK is simulated.

Furthermore, more uplink backhaul subframes may be configured than the number of configured downlink backhaul subframes. In such a case, an uplink grant (on PDCCH or PHICH) in one downlink backhaul subframe corresponds to an uplink (PUSCH) transmission in several uplink backhaul subframes. In order to uniquely determine the timing of the grant (PDCCH), the data transmission (PUSCH) and/or the feedback (PHICH) in the scheme of the present invention, an index of the corresponding uplink backhaul subframe may be indicated in the uplink grant. Alternatively, the uplink transmission process identification may be indicated in the uplink grant. The uplink transmission process identification would uniquely identify the process number of the related uplink transmission process. Since one uplink transmission process identification is associated with one uplink backhaul subframe within one round trip time, this signaling enables for clear establishing of the retransmission protocol timing in the uplink backhaul.

The above described mechanisms have been designed so as to maintain the backward compatibility of the user terminals. Thus, a mobile terminal communicates with a relay node in the same way as with a network node. However, in accordance with yet another embodiment of the present invention, the later mobile terminals (for instance UEs compliant with 3GPP LTE-A Release 10 and more) may be capable of distinguishing between relay nodes and network nodes.

In particular, the configured uplink backhaul subframes available for the transmission may be signaled to the release-10 r-UEs. In these configured uplink backhaul subframes, the release-10 r-UEs would assume that no signal will be received from the relay node since the relay node transmits to the network node (d-eNB). Accordingly, a Release-10 mobile terminal shall assume reception of a positive acknowledgement (ACK) for the corresponding uplink transmission process on the relay access link (between the mobile terminal and the relay node). As a consequence of the positive acknowledgement, the corresponding uplink transmission process on relay access link is suspended. Such a protocol has an advantage that the mobile terminal does not need to try to decode the associated PHICH, which enables saving the energy in such an r-UEs. Moreover, a PHICH error is avoided.

FIG. 16 illustrates a system 1600 according to the present invention, comprising a network node 1610 as described above in any of the embodiments and a relay node 1650 as described above in any of the embodiments. The network node 1610 is a node such as a base station, a node B, an enhanced node B, etc., to be connected to a network and to a relay node 1650. The relay node 1650 is connectable to the network node 1610 preferably via a wireless interface 1620. However, the relay node 1650 may also be connected to the network node via a cable connection. The relay node 1650 is further connectable to at least one mobile terminal 1690 via a wireless interface 1660. The relay node 1650 may be an apparatus similar to the network node 1610. However, the relay node 1650 may also differ from the network node. In particular, the relay node may be simpler and may support less functions than the network node 1610. The advantage of providing between a network node 1610 and the mobile terminal 1690 a relay node is for instance, increasing the coverage, enhancing the group mobility, etc. For a user terminal 1690 the relay node 1650 may seem as a normal network node 1610. This is beneficial especially in view of the backward compatibility of older user terminals. However, the mobile terminal 1690 may also be capable of recognizing between a relay node and between a network node. The mobile terminal 1690 may be a mobile telephone, a PDA, a portable PC, or any other apparatus capable of mobile and wireless connection to a network node and/or a relay node.

A network node in accordance with the present invention includes a link control unit for selecting time intervals to be available for the uplink transmission 1620 of data from the relay node 1650 to the network node 1610. The selection of the available time intervals may be performed according to the above embodiments, for instance based on the configuration of downlink time intervals on the relay link. Furthermore, access link timing may be considered for configuration of the available time intervals. In particular, the timing of the transmission processes on the uplink 1660 between the mobile terminal 1690 and the relay node 1650. Other ways of selecting the available time intervals are also possible.

In the system 1600, depending on the method for selecting the available time intervals, the selection may be performed by the link control unit 1611 and 1651 in the same way at the network node 1610 and at the relay node 1650. This is possible, if the way for determining of the time intervals is unique, such as in the case where it is determined based on the downlink time intervals and the exact rules are defined, or in the case of avoiding the time delay on the access uplink 1660. However, the network node 1610 may also select the available time intervals and signal them (schematically illustrated by an arrow 1640) to the relay node 1650. The relay node receives the signal 1640 and configures in its link control unit 1651 the available time intervals accordingly. The signaling may be semi-static, as proposed, for instance, in the LTE system. However, the signaling could also be dynamic.

Once the available time intervals are determined, according to the present invention, a number of transmission processes for transmission 1620 of data on relay link is selected. This may be performed by the transmission configuration unit 1612, 1652 of both the network node 1610 and the relay node 1650 in the same way, in case unambiguous rules are defined. Alternatively, the link control unit 1611 of the network node determines the number of transmission processes on the relay link and signals it (schematically illustrated as an arrow 1630) to the relay node 1650. The link control unit 1652 of the relay node 1650 receives the number of transmission processes from the network node and employs it for mapping of the data to be transmitted onto the available time intervals. The mapping is performed by the transmission unit 1653 in the relay node according to a predefined order and cyclically. Thus, the mapping is unique once the number of processes is known. Since the network node 1610 has also knowledge of the number of processes and the available time intervals, its receiving unit 1613 may derive the mapping of the processes onto the available time intervals in the same way as the transmitting unit 1653 of the relay node 1650. Based on this mapping, both the network node 1610 and the relay node 1650 configure their timing of the retransmission protocol. After the configuration, the transmission 1620 of data from the relay node to the network node may take place.

In addition, based on the determined timing, the timing of receiving and transmitting uplink grants and acknowledgement feedback may also be derived according to a fixed rule in both the network node and the relay node.

In the above description of the nodes and the system according to the present invention, an example of relay node and a network node has been taken. However, the two communication nodes 1610 and 1650 are not necessarily the network node and relay node, respectively. The nodes 1610 and 1650 may be any nodes included in a communication system communication together using a retransmission protocol of the present invention.

The present invention thus introduces an efficient retransmission protocol (HARQ protocol) for backhaul uplink. This protocol is synchronous with respect to the order of transmitting the transmission processes since the mapping of the transmission processes to available uplink subframes is performed in consecutive order and cyclically. The present invention also provides two possibilities for determining the number of backhaul uplink transmission processes. The number of transmission processes on backhaul uplink can be minimized as an implicit function of the uplink backhaul subframe configuration, which may be itself an implicit function of the downlink backhaul subframe configuration. This means that at the network node as well as at the relay node, the number of transmission processes is determined implicitly in the same way based on the configuration of the uplink backhaul and, in particular, based on the available uplink backhaul subframes. Alternatively, the number of transmission processes can be signaled explicitly, for instance, from the network node to the relay node. Advantageously, the number of transmission processes is signaled within the RRC signaling as a relay node specific signal.

The implicit determination of the number of backhaul uplink transmission processes leads to an optimum number of transmission processes from the point of view of delay minimizing and buffering requirements. Moreover, no explicit signaling is necessary, leading thus to a bandwidth efficient solution. However, there is no flexibility in configuration.

On the other hand, explicit signaling of the number of transmission processes from network node to the relay node enables, in general, the full control by the network node with respect to the number of transmission processes and provides more flexibility by setting the number of transmission processes higher than the implicitly derived minimum. Setting the number of transmission processes higher than the minimum may lead to a more time-regular or even fixed process-to-subframe pattern. For instance, the same RTT for all transmission processes may be achievable or a smaller RTT variation within a single transmission process may be possible, etc.

It may be particularly advantageous to include a parameter for signaling the number of transmission processes together with signaling for the backhaul subframe configuration. For instance, in case of the LTE system, the number of transmission processes may then be signaled by RRC signaling within the signaling related to the backhaul subframe configuration. Accordingly, in case of modified backhaul subframe configuration, no additional signaling for the number of transmission processes is required and thus, the possibility of violating the minimum RTT requirement may be reduced.

The explicit signaling parameter may indicate, for instance, an integer value from 1 to k, k being the maximum configurable number of transmission processes. For LTE Release 8 FDD, the value of k is 8. In addition, the parameter may also take a value which is interpreted as indication that the number of transmission processes is to be determined implicitly as described above. For instance, apart of the valid set of number of transmission processes $\{1, 2, 3, \ldots, k\}$ a value "0" or a value "k+1" or any other reserved value may indicate that the number of transmission processes is to be determined implicitly. Although for the LTE Release 8 k=8 is defined, k=6 could also be sufficient if the relation to the MBSFN subframes is considered as described above for relay node sharing the same frequency spectrum for the access link and the backhaul link. In such a case, a parameter with 8 possible values may be signaled with the mapping of parameter values on the number of transmission processes as follows: parameter values 1 to 6 would map on the corresponding number of transmission processes 1 to 6. At least one of the remaining values may be used to signal that the implicit method shall be used to determine the number of transmission processes. The advantage of keeping the number of possible parameter values to not exceed 8 is that in order to signal 8 values, a 3-bit indicator is necessary. Extending to 9 or more values requires one signaling bit more. However, this was only an example and any other mapping may also be applied for signaling the number of transmission processes according to this embodiment.

Alternatively, the explicit signaling allows any number of transmission processes, i.e. any value from the set of values $\{1, 2, 3, \ldots, k\}$; however, the number of transmission processes is provided only as an optional configuration parameter. If the parameter is present in the configuration signal, then the signaled value is applied. If the parameter is not present, then the minimum number of required transmission processes is determined implicitly and applied.

On the other hand, in general, the explicit signaling enables to signal also a configuration in which the requirement on delay between adjacent subframes allocated for the same process is less than the minimum RTT. It may be noted that in a LTE Release 8 FDD system, the minimum RTT for the same process is defined as 8 ms. In order to provide more flexibility and at the same time overcome the above problem of the explicit signaling, the behavior of the relay node may be specified according to one of the following mechanisms which represent various embodiments of the present invention.

The first possibility is that the signaled value leading to a delay smaller than the minimum RTT is ignored and the implicit determination is used for obtaining a valid number of transmission processes, i.e., a smallest possible number of transmission processes leading to a distance between two backhaul uplink transmissions for a single process of at least minimum RTT for each process. When the signaled value does not lead to delay between two transmissions of the same process smaller than minimum RTT, it is adopted. This solution provides flexibility and, at the same time, avoids problems with missed (re)transmissions opportunities.

Another possible behavior of the relay node is to ignore any signaled value of number of transmission processes which would result, for the given configuration of backhaul uplink subframes or time intervals, to a distance smaller than the minimum RTT between two backhaul uplink transmissions of the same process, and consequently not execute any transmissions until a number of transmission processes is obtained that fulfils the minimum RTT between two backhaul uplink transmission for all processes, for example by mean of a reconfiguration of the number of transmission processes by explicit signaling. Alternatively, a default value of the maximum number of processes k can be applied to be able to continue with a rudimentary data delivery.

However, ignoring the signaled value or changing it distributes the control of the number of transmission processes to both the network node and the relay node. In order to avoid such a situation, another possible behavior of the relay node is to apply the signaled number of transmission processes even in case it does not fulfill the requirement on minimum RTT for all involved processes, and to use occasional DTX (discontinuous transmission). DTX should be applied in those transmission time intervals or subframes where the minimum RTT requirement is not fulfilled; some examples are given hereafter. During DTX, at least part of the transmitter circuitry can be switched off. This has advantages such as reduction of the power consumption and interference generation in the system. In particular, in case the signaled number of transmission processes violates the minimum RTT, the relay node transmits only in subframes which fulfill the minimum RTT requirement for a transmission process. In other subframes (referred to as "violating subframes" later in this document since they violate the minimum RTT requirement) no data transmission is performed, even if the relay node had received a valid grant for uplink resources in those subframes. Such behavior leads to a so-called "heavy downlink" meaning that there are more downlink shared channel opportunities for transmission than the uplink opportunities (subframes).

The discontinuous transmission may be applied only to transmission of data, whereas the control information such as transmission acknowledgements for downlink data transmission(s) (positive and/or negative) may still be transmitted in the violating subframes. For example, in 3GPP LTE, the transmission on PUSCH would be switched off for the violating subframes. However, the transmissions of ACK/NACK messages on PUCCH for earlier PDSCH transmission(s) could still be allowed. In such a case, the relay node can transmit the feedback for downlink transmissions as soon as possible, leading to a reduced latency of the downlink data transmission.

Alternatively, the DTX may be applied to any or all uplink physical channels in a violating time interval, e.g. there is no transmission of data and no transmission of control signaling on the backhaul uplink subframe. For LTE this would mean that there is no transmission on PRACH, PUSCH and PUCCH.

DTX of the backhaul uplink subframes may lead to missed opportunities for sending the feedback, particularly if the DTX operation applies to physical or logical control channels, and thus would lead to an uncertainty at the network side as to whether a downlink transmission has been successfully decoded or not. In order to overcome this problem, ACK/NACK signaling information for the backhaul uplink may be advantageously bundled or multiplexed in the next available backhaul UL PUCCH transmission, or, in general in the next available control information transmission opportunity. The bundling or multiplexing of acknowledgements may work similarly as, for instance, in the LTE Release 8 TDD (cf., for instance, specification 3GPP TS 36.213, "Evolved Universal Terrestrial Radio Access (E-UTRA); Physical layer procedures", Section 7.3, which is incorporated herein by reference). From the acknowledgement bundling or multiplexing operation perspective, the DTX subframe would be handled like a downlink subframe, as there is effectively no uplink transmission opportunity in a DTX subframe—just like in a downlink subframe. In context of the above referenced method from 3GPP TS 36.213, a DTX subframe would be equivalent to a subframe with PDSCH transmission. In such a case, the entire subframe that is DTX'ed on the backhaul may be used as an access uplink subframe, meaning that it may be used for the transmission of data to the relay node from a mobile terminal.

The backhaul uplink DTX mode may be configurable by the network node for indicating whether there is no transmission only on data channel(s) (for instance PUSCH) or in the entire uplink subframe regardless of data or signaling information are carried thereby. The backhaul uplink DTX mode may be signaled, for instance, within the higher layer signaling. Alternatively, the DTX mode may be defined by the relay node capabilities or signaled from the relay node to the network node. However, alternatively, a standard may also fixedly define any single one of the above modes.

FIG. 17 illustrates an example of mapping one, two, and three transmission processes on backhaul uplink (cf. rows with "HARQ process" for N=1, N=2 and N=3). In this example, subframes with numbers 3 and 7 within each radio frame are configured (available) for backhaul downlink (Un DL) transmission. This corresponds to subframes with number 3, 7, 13, 17, 23, 27, etc. An assumption is made that backhaul uplink (Un UL) subframes are always available four subframes after the corresponding downlink subframes. Then, backhaul uplink subframes are configured as number 1 and 7 of each radio frame, which means that the available subframes are subframes with number 1, 7, 11, 17, 21, 27, etc. As can be seen from FIG. 17, the minimum number of retransmission (HARQ) processes that always fulfils a requirement of at least 8 ms long RTT for each backhaul uplink HARQ process is N=2, where the resulting RTT is always equal to 10 ms for the N=2 processes. In case the number of transmission processes N=1 is configured, every second backhaul uplink subframe is DTX (cf. horizontally dashed rectangles with number 1 meaning the first transmission process; delay shorter than the required minimum RTT between two subframes is illustrated by a dashed line; the delay equal or larger than the required minimum RTT is illustrated by a solid line). Effectively, only one single HARQ process with a 10 ms periodicity (corresponding to 10 ms RTT) is used. In particular, the uplink transmission takes place in subframes number 7, 17, 27, etc. There is no HARQ related transmission in subframes 11, 21, 31, etc., these subframes are DTX. In contrast, the configuration of number of transmission processes N=2 leads to a fixed delay of 10 ms for each of the two transmission processes. In case of N=3, each of the three transmission processes will have an repeatedly alternating delay of 14 ms and 16 ms. It may be noted that in this figure, the mapping of HARQ processes starts on subframe 7 with process number 1 due to the assumed configuration being applied starting at subframe 0 in radio frame 0. Therefore, the first usable downlink subframe is subframe 3, and the first usable uplink subframe is subframe 7. In other radio frames 4n where n is an integer and n>0, subframe 1 can be used as uplink subframe corresponding to downlink subframe 7 in radio frame 4n−1. This is shown e.g. by the relation between subframe 37 for Un DL and subframe 41 for Un UL in FIGS. 17-19. It should be noted that the numbering of DL subframes in FIG. 17 cyclically from 0 to 9 is only exemplary to emphasize the structure of frames and subframes. The numbering may also be continuous as shown in FIGS. 18 and 19.

FIG. 18 illustrates another example of mapping one, two, and three transmission processes on backhaul uplink. In this example, subframes with number 3, 7, 11, 13, 17, 23, 27, 31, 33, 37 in the shown four consecutive radio frames are configured for Un DL transmission. An assumption is made again that the backhaul uplink subframes are always available after four subframes after the backhaul downlink subframes. Thus, the Un UL subframes with number 7, 11, 15, 17, 21, 27, 31, 35, 37, 41, 47, etc. are configured for transmission (shown as vertically hatched subframes). As can be seen from FIG. 18, the minimum number of HARQ processes that always fulfils the requirement of at least 8 ms RTT for each UL transmission process is N=3. In case the number of transmission processes N=1 is configured; several backhaul uplink subframes are not used for the transmission (DTX). Effectively, only a single HARQ process with periodicity of alternating 8 ms and 12 ms delay is used. This corresponds to the average RTT of 10 ms. In particular, subframes with number 7, 15, 27, 35, 47, etc. are used for the uplink transmission. In case N=2 is configured, to some backhaul uplink subframes DTX has to be applied. Effectively, two HARQ process with periodicity of alternating 8 ms, 16 ms and 16 ms are used. This results in average RTT of 40/3 ms. In particular, subframes with number 7, 15, 27, 35, 47, etc. are used for the backhaul uplink transmission. This is similar to re-using the 8 ms and 16 ms pattern of Release 8 (cf. FIG. 11) by defining fewer HARQ processes than required to achieve the minimum RTT for the signaled number of processes, i.e. equal to or larger than 8 ms RTT.

In one embodiment, the relation between uplink subframes and HARQ process is not affected by the DTX behavior. For example, process 2 is associated to subframe 17, even though it is DTX (cf. example of FIG. 18 for N=2). Likewise, due to the cyclic fashion of associating HARQ processes to UL subframes, process 1 is associated to subframe 21 even though it is DTX. However, if due to another example not subframe 21 but 25 is available, then process 1 is associated to subframe 25 because the previous subframe 17 was associated to process 2. In this way, subframe 25 and therefore process 1 in that subframe is not DTXed, because the time between subframe 25 and the previous transmission opportunity in subframe 15 is not violating the minimum RTT requirement of 8 ms. On the other hand, since then the interval between subframe 25 and 31 is less than the minimum RTT requirement, subframe 31 is to be DTX'ed. In such an embodiment, in order to determine a round trip time for a transmission process, subframes that are designated as DTX are not taken into account. As an example, according to FIG. 18, the RTT between the process 1 transmission in subframe 31 and the previous transmission, subframe 21 is not regarded (considered) since it is designated as DTX; the previous transmission thus occurred in subframe 15, resulting in an RTT of 16 ms. In other words, in this embodiment, when it is judged that mapping a certain process (for instance a process with number x) to available time intervals leads to a smaller RTT between a first and a second time interval, wherein the second time interval is the next available time interval for the same process as in the first time interval, than the minimum RTT, no transmission of user and/or signaling data belonging to any transmission process takes place in such a second time interval, without affecting the association between time interval and transmission process. This is because the transmission of processes with different number follows a cyclical scheme resulting from mapping them onto available time intervals without considering the minimum RTT at first. Thus, the "no transmission" intervals are determined based on already cyclically mapped processes.

In another embodiment not shown in the figures, the cyclic mapping of HARQ processes to subframes is ignoring the subframes designated as DTX. Therefore assuming an UL subframe configuration as shown in FIG. 18 and the example for N=2, subframe 17 would be designated as DTX (as shown). However, the next available subframe 21 would be associated to process 2 (as the previous non-DTX subframe association of subframe 15 was to process 1), and it would fulfil the minimum RTT requirement for process 2, as the previous association for process 2 was in subframe 11, resulting in an RTT of 10 ms in this case. The effect on other subframes follows this logic mutatis mutandis. In other words, in this embodiment, when it is judged that mapping a certain process (for instance a process with number x) to available time intervals leads to a smaller RTT between a first and a second time interval, wherein the second time interval is the next available time interval for the same process as in the first time interval, than the minimum RTT, no transmission of user and/or signaling data belonging to that particular transmission process x takes place in such a second time interval. As a consequence, the association of the process x to such a second time interval is removed, and instead the subsequent available time intervals are re-associated in a cyclical fashion as before, however starting with process x associated to the next available time interval after said second time interval. This association needs to be judged again for compliance with the minimum RTT according to this embodiment. Thus, the "no transmission" intervals are determined during the cyclical mapping.

FIG. 19 illustrates another example of mapping one, two, and three transmission processes on backhaul uplink. In the previous example described with reference to FIG. 18, subframes with number 3, 7, 11, 13, 17, 23, 27, 31, 33, 37 in consecutive four radio frames are configured for Un DL transmission. In contrast, in this example, the subframes 3, 7, 11, 23, 27, 31 in consecutive four radio frames are configured for Un DL transmission, i.e. subframes 13, 17, 33, 37 are no longer available. This affects the availability of the uplink subframes accordingly. However, assuming that two transmission processes are used, exactly the same mapping of transmission processes as in the previous example can be achieved with the same number of HARQ processes and RTT (cf. alternating RTT of 8 ms and 12 ms). In this way there are fewer subframes available for backhaul downlink than in the previous example of FIG. 18. Thus, with configuring fewer HARQ processes than required for fulfilling the minimum RTT requirements for all HARQ processes and assuming DTX behavior, it is possible to have more subframes for the backhaul DL available without affecting the backhaul uplink retransmission protocol or behavior. However it may be noted that in this example, due to the different subframe configuration, configuring N=2 results in this case in the same behavior as if the number of HARQ processes is determined from the implicit rule according to this invention; therefore no special DTX mechanism needs to be employed. It can also be noted that setting in this example N=3 results in a regular 20 ms RTT pattern for the HARQ processes, as described previously in this document to provide an example of a possible motivation for using more HARQ processes than required to fulfil the minimum RTT criterion.

FIG. 20 summarizes an advantageous embodiment of the present invention. In particular, the methods performed are shown for two nodes—a first node (denoted "UL data transmitting node" in FIG. 20) and a second node ("UL data receiving node" in FIG. 20). These nodes may correspond to a relay station and a base station, respectively. However, the present invention is not limited thereto and other nodes may be configured accordingly. In this embodiment, the second node first determines the time intervals available for the transmission of data to the first node 2010 and/or from the first node to the second node. Then, the second node determines 2010 a number of transmission processes which are to be used for transmission of data between the first and the second node. The determined number of transmission processes is signaled (2030) to the first node. The signaling is performed by transmitting within a signaling data to the first node an indicator which indicates a particular number of transmission processes to be configured. The indicator may also indicate that the number of transmission processes is to be determined implicitly based on other signaled parameters, in particular, based on the configuration of the transmission intervals available for data transmission. The signaling data may also further include the positions of time intervals available for transmission determined in step 2010. The first node receives 2035 the indicator, and 2040 and 2045 the number of transmission processes accordingly at the second node and the first node are configured, respectively. The transmission processes are to be mapped to the available time intervals cyclically. The first node evaluates (judges) whether such mapping results in violating the requirement of a minimum RTT for any of the transmission processes. In other words, it is checked 2050 if there are time intervals for any of the transmission processes that are located in a distance smaller than the minimum RTT given by the system. If this is the case, then no transmission 2060 of data takes place in such time intervals. This is performed for instance by means of discontinuous transmission (=DTX) in which the transmitter may be switched off, saving the power and reducing the interference. The "no transmission" may apply either to only a user data or to both user and signaling data. For instance, signaling data may be acknowledgements (positive or negative), requests for grants, channel quality feedback, or generally any signal that needs to be transmitted via a physical channel. In order to ensure transmitting the signaling data without longer delays, the feedback information (such as acknowledgements) may be bundled or multiplexed with other signaling data in the other available time intervals. The (remaining) data that is not DTXed is then transmitted 2070 from the first node to the second node. The second node receives the data 2080 including any of user or signaling data. It should be noted that FIG. 20 is a schematic drawing only and does not present the real timing conditions. For instance, transmitting data 2070 includes transmitting of any of the signaling or used data in a plurality of available time intervals, wherein in some interval no data transmission at all or no signaling data transmission takes place.

The description of LTE specific procedures is intended to better understand the LTE specific exemplary embodiments described herein and should not be understood as limiting the invention to the described specific implementations of processes and functions in the mobile communication network. Similarly, the use of LTE specific terminology is intended to facilitate the description of the key ideas and aspects of the invention but should not be understood as to limit the invention to LTE systems.

Another embodiment of the invention relates to the implementation of the above described various embodiments using hardware and software. It is recognized that the various embodiments of the invention may be implemented or performed using computing devices (processors). A computing device or processor may for example be general-purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Most of the examples have been outlined in relation to a 3GPP-based communication system, in particular LTE, and the terminology mainly relates to the 3GPP terminology. However, the terminology and the description of the various embodiments with respect to 3GPP-based architectures are not intended to limit the principles and ideas of the inventions to such systems.

Also the detailed explanations of the resource mapping in the LTE are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described. Furthermore the concept of the invention may be also readily used in the LTE RAN (Radio Access Network) currently discussed by the 3GPP.

Summarizing, the present invention relates to configuration of retransmission protocol on the uplink between a network node and a relay node. In particular, a mapping of a specified number of uplink transmission processes is performed in a predefined order and periodically repeated. The number of transmission processes is selected based on the time intervals available for the data transmission and may be specified so as to control the round trip time on the relay uplink. The timing of the retransmission protocol may be derived accordingly using a predetermined rule.

The invention claimed is:

1. A communication apparatus comprising:
   a transmitter which, in operation, transmits an indicator that indicates a number of HARQ process identifiers (IDs), wherein each of the HARQ process IDs is an identifier of a processing unit of Hybrid Automatic Repeat Request (HARQ) and the number of HARQ process IDs is determined based on subframe locations available for uplink data transmission, wherein the indicator is transmitted in a backhaul downlink subframe, which has a corresponding backhaul uplink subframe that is the fourth subframe after the backhaul downlink subframe; and
   a receiver which, in operation, receives a frame in which HARQ processes associated with a HARQ process ID up to the indicated number of HARQ process IDs are mapped on the subframe locations available for the uplink data transmission;
   wherein the transmitter, in operation, retransmits data according to the HARQ.

2. The communication apparatus according to claim 1, wherein the number of HARQ process IDs is selected by an upper layer as a smallest number among numbers of HARQ process IDs having a roundtrip time that is larger than a minimum system round trip time, wherein the roundtrip time is a transmission time interval between two consecutive transmission opportunities for the same HARQ process.

3. The communication apparatus according to claim 1, which is an eNodeB, wherein the receiver of the eNodeB receives the HARQ as an uplink repeat request from a relay node.

4. A communication method comprising:
   transmitting an indicator that indicates a number of HARQ process identifiers (IDs), wherein each of the HARQ process IDs is an identifier of a processing unit of Hybrid Automatic Repeat Request (HARQ) and the number of HARQ process IDs is determined based on subframe locations available for uplink data transmission, wherein the indicator is transmitted in a backhaul downlink subframe, which has a corresponding backhaul uplink subframe that is the fourth subframe after the backhaul downlink subframe;
   receiving a frame in which HARQ processes associated with a HARQ process ID up to the indicated number of HARQ process IDs are mapped on the subframe locations available for the uplink data transmission; and
   retransmitting data according to the HARQ.

5. The communication method according to claim 4, wherein the number of HARQ process IDs is selected by an upper layer as a smallest number among numbers of HARQ process IDs having a roundtrip time that is larger than a minimum system round trip time, wherein the roundtrip time is a transmission time interval between two consecutive transmission opportunities for the same HARQ process.

6. The communication method according to claim 4, wherein the HARQ is an uplink repeat request from a relay node to an eNodeB.

* * * * *